(12) United States Patent
Nosaka et al.

(10) Patent No.: US 7,666,100 B2
(45) Date of Patent: Feb. 23, 2010

(54) POWER TRANSMISSION DEVICE

(75) Inventors: Michiyasu Nosaka, Anjo (JP); Yasuo Tabuchi, Toyoake (JP); Yoshiki Tada, Okazaki (JP); Takayuki Suzuki, Hekinan (JP); Motohiko Ueda, Okazaki (JP)

(73) Assignee: DENSO CORPORATION, Kariya (JP)

( * ) Notice: Subject to any disclaimer, the term of this patent is extended or adjusted under 35 U.S.C. 154(b) by 385 days.

(21) Appl. No.: 11/528,605

(22) Filed: Sep. 28, 2006

(65) Prior Publication Data
US 2007/0078011 A1 Apr. 5, 2007

(30) Foreign Application Priority Data

Oct. 4, 2005 (JP) .............................. 2005-291324
Oct. 7, 2005 (JP) .............................. 2005-295034

(51) Int. Cl.
*F16D 9/00* (2006.01)
(52) U.S. Cl. ..................................................... 464/32
(58) Field of Classification Search .................. 464/32, 464/47
See application file for complete search history.

(56) References Cited

U.S. PATENT DOCUMENTS

| | | | | |
|---|---|---|---|---|
| 2,569,593 A | * | 10/1951 | Whitney | |
| 2,966,977 A | * | 1/1961 | Johnson | |
| 4,257,147 A | * | 3/1981 | Moss | |
| 4,888,539 A | * | 12/1989 | Estabrook et al. | ......... 464/47 X |
| 6,234,904 B1 | * | 5/2001 | Kawaguchi et al. | |
| 6,332,842 B1 | * | 12/2001 | Tabuchi et al. | ............ 464/32 X |
| 2003/0130044 A1 | | 7/2003 | Kanai et al. | |
| 2003/0194263 A1 | | 10/2003 | Ueda et al. | |
| 2005/0239555 A1 | | 10/2005 | Ueda et al. | |
| 2006/0089201 A1 | | 4/2006 | Nosaka et al. | |

FOREIGN PATENT DOCUMENTS

| | | |
|---|---|---|
| JP | A-2003-206950 | 7/2003 |
| JP | A-2003-307265 | 10/2003 |

* cited by examiner

*Primary Examiner*—Greg Binda
(74) *Attorney, Agent, or Firm*—Posz Law Group, PLC

(57) ABSTRACT

A power transmission device (10) comprises a rotatable rotary part (1, 2) to which a rotational drive force is transmitted from a drive source and a power transmission shut-off member (3) that shuts off transmission of an excessive torque between the rotary part and a rotating shaft (4) of a device to be driven. The power transmission shut-off member is threadedly coupled to the rotating shaft and can rotate with the rotating shaft. The rotary part is installed so as to be sandwiched between the power transmission shut-off member and the rotating shaft. A disc spring (8), installed between the power transmission shut-off member and the rotary part, is further provided. A caulked part (204*a*) for preventing a part of the power transmission shut-off member from dropping is provided on the front end side of the rotating shaft.

14 Claims, 21 Drawing Sheets

POWER TRANSMISSION DEVICE

BACKGROUND OF THE INVENTION

1. Field of the Invention

The present invention relates to a power transmission device and, more particularly, is preferably used in a compressor for a vehicle air conditioner operated by an external power source, such as an engine, via a belt etc. by being incorporated therein.

2. Description of the Related Art

A refrigerant compressor for vehicle air conditioner is driven by an external power source, such as an engine, via a belt, pulley, etc., and an electromagnetic clutch may be inserted therebetween in order to separate connection between the engine and the compressor. If, however, an electromagnetic clutch is not inserted, the cost is reduced, and therefore, in some cases, an electromagnetic clutch may be omitted. In this case, in a power transmission device of a compressor for a vehicle air conditioner operated by an external power source such as an engine via a belt etc., a torque limiter is installed in order to avoid a trouble, such as belt damage, if the compressor seizes.

Torque limiters include one in which a part of the power transmission path is threadedly joined to utilize an excessive axial force generated at the threadedly joined part due to an excessive torque when the compressor seizes (for example, refer to patent document 1). As described above, in a conventional power transmission device for transmitting power to a compressor, a power transmission shut-off device (torque limiter) is arranged in order to avoid a trouble, such as damage to a belt for power transmission, if the compressor seizes. Conventionally, a power transmission shut-off device (torque limiter) having a structure in which a portion of a power transmission portion is threadedly inserted has been proposed and a torque limiter system that utilizes threaded insertion is a system for cutting off the power transmission path by rupturing a portion of the power transmission path using an excessive axial force generated at the threadedly inserted portion by the excessive torque generated when the compressor seizes. In other words, the torque limiter system has a structure in which the power transmission shut-off member is broken by a tensile force of the excessive axial force generated by threaded fastening using the excessive torque generated by the seizing phenomenon of the compressor. However, when the power transmission shut-off member ruptures, depending on the shape of the ruptured part, there is a possibility of a situation where the thread portion of the power transmission shut-off member is re-fastened. In this case, a gap space formed by the power transmission shut-off member and the bearing surface of an inner hub accommodating the power transmission shut-off member is eliminated and the bearing surface of the inner hub is sandwiched by the thread portion of the power transmission shut-off member and the shaft end surface of the compressor, and thus there has been a trouble that power cannot be shut off.

A conventional power transmission device 50 having the above-mentioned problem is explained with reference to FIG. 19 to FIG. 21. FIG. 19 shows a partial side section view of a conventional example of a power transmission device utilizing threaded fastening and FIG. 20 and FIG. 21 are partial side section views showing two states in which the torque limiter (power transmission shut-off member) of the power transmission device 50 shown in FIG. 19 has operated and ruptured. In the configuration of the power transmission device 50 shown in FIG. 19, rotation of a power source such as an engine is transmitted to a pulley via a belt etc. and, further, is transmitted to the power transmission device 50 assembled to the pulley. The configuration of the power transmission device 50 is fundamentally the same as that of the power transmission device of the present invention shown in FIG. 1 etc. and will be described later. Therefore, the details are not explained here. In the power transmission device 50, power is first transmitted to a hub and then transmitted in the order of the power transmission shut-off member and the rotating shaft of the compressor etc. threadedly fastened to the power transmission shut-off member.

The power transmission device 50 in the conventional example in FIG. 19 is assembled by threadedly coupling a thread part 303 of a power transmission shut-off member 3 to a thread part 402 of a rotating shaft 4 and moving it in the direction toward a device to be driven or the rotating shaft (in the rightward direction in FIG. 19). Due to this, an inner hub 204 of a hub 2 is sandwiched between, and compressed by, the power transmission shut-off member 3 and the rotating shaft 4. In this manner, by the axial compression force due to the threaded coupling of the power transmission shut-off member 3 and the rotating shaft 4, a frictional force is produced at a contact surface at which the power transmission shut-off member 3 and the inner hub 204 come into contact with each other and at a contact surface at which the inner hub 204 and the rotating shaft 4 come into contact with each other. Due to the frictional force, the power transmission shut-off member 3 and the hub 2 rotate, as one body, together with the rotating shaft 4.

FIG. 20 and FIG. 21 are diagrams for explaining a configuration after the power transmission shut-off member 50 has operated and the power transmission shut-off member 3 has ruptured. In FIG. 20, if the power transmission shut-off member 3 ruptures at a rupture part 301, ruptured surfaces 308 and 309 are formed and the power transmission shut-off member is split into a flange part 302 and a thread member 306. The ruptured surfaces 308 and 309 are not necessarily flat plane-shaped. Therefore, in FIG. 20, as the flange side ruptured surface 308 rotates the thread member side ruptured surface 309, the thread member 306 of the power transmission shut-off member advances toward the side of the compressor (device to be driven). Due to this phenomenon, the gap "B" 9 formed in FIG. 19 and FIG. 20 is eliminated, an end surface 307 of the thread member 306 of the power transmission shut-off member interferes with an opposite contact surface 204e of the hub, and further, a hub bearing 204c is sandwiched by the end surface 307 of the thread member 306 and a shaft contact surface 403 on the rotating shaft side, and thus power is transmitted. In other words, even if the power transmission shut-off member 3 has operated and ruptured, power is not shut off and a problem arises that the power is transmitted to the rotating shaft and further to the device to be driven such as the compressor.

[Patent document 1] Japanese Unexamined Patent Publication (Kokai) No. 2003-206950

SUMMARY OF THE INVENTION

The above-described circumstances being taken into account, the present invention has been developed and an object thereof is to provide a power transmission device capable of avoiding troubles such as that power cannot be shut off even if a torque limiter operates in a torque limiter system utilizing threaded fastening.

In a first aspect of the present invention, in order to attain the above-described object, a power transmission device (10) comprises a rotatable rotary part (1, 2) to which a rotational drive force is transmitted from a drive source and a power transmission shut-off member (3) that shuts off transmission of an excessive torque between the rotary part and a rotating shaft (4) of a device to be driven. The power transmission shut-off member is threadedly coupled to the rotating shaft and capable of rotating together with the rotating shaft as one body. The rotary part is installed so as to be sandwiched between the power transmission shut-off member and the rotating shaft. An elastic member (8) installed between the power transmission shut-off member and the rotary part is also included.

Due to the configuration described above, the elastic member (8) is installed between the power transmission shut-off member and the rotary part in the torque limiter system utilizing threaded fastening and, therefore, when the power transmission shut-off member operates and splits, the elastic member acts by means of its elastic force so that a part of the split power transmission shut-off member is separated from the rotary part and prevents each part of the split power transmission shut-off member from interfering with each other and as a result, it is possible to avoid the trouble that power transmission cannot be shut off because of the re-fastening of the power rupture part and to shut off power, without fail, when the compressor seizes.

In a second aspect of the present invention, the power transmission shut-off member is configured so as to split into a first portion (302) not threadedly coupled to the rotating shaft and a second portion (306) threadedly coupled to the rotating shaft when the power transmission shut-off member operates in the above-mentioned first aspect. Further, at this time, the configuration is arranged so that the first portion can move freely with respect to the second portion.

According to the present aspect, the first portion can move freely with respect to the second portion and, therefore, it is possible to prevent the first portion from interfering with the second portion when the power transmission shut-off member operates and, therefore, to avoid the trouble that power transmission cannot be shut off even if the power transmission shut-off member ruptures.

In a third aspect of the present invention, the first portion is configured so as to be capable of moving freely in the axial direction of the rotating shaft in the above-mentioned second aspect.

According to the present aspect, the first portion can move in the axial direction and separate from the second portion and, therefore, it is possible to prevent the first portion from interfering with the second portion.

In a fourth aspect of the present invention, the elastic force of the elastic member acts on the power transmission shut-off member in the axial direction of the rotating shaft in any one of the above-mentioned first to third aspects.

According to the present aspect, the elastic force of the elastic member acts on the power transmission shut-off member in the axial direction of the rotating shaft and, therefore, when the power transmission shut-off member operates and splits, a part of the split power transmission shut-off member is pushed and moved in the axial direction and each part of the split power transmission shut-off member is prevented from interfering with another part. Therefore, it is possible to avoid the trouble that power transmission cannot be shut off even if the power transmission shut-off member ruptures.

In a fifth aspect of the present invention, the elastic member acts on the first portion so that the first portion separates from the second portion when the power transmission shut-off member operates in any one of the above-mentioned second to fourth aspects.

According to the present aspect, the elastic member acts so that the split first portion separates from the second portion and, therefore, the first portion is prevented from interfering with the second portion and thus it is possible to avoid the trouble that power transmission cannot be shut off even if the power transmission shut-off member ruptures.

In a sixth aspect of the present invention, a stopper means (204a, 1000) is provided so as to prevent the power transmission shut-off member from dropping in any one of the above-mentioned first to fifth aspects. A gap (204b) is provided between the stopper means and the power transmission shut-off member.

According to the present aspect, it is possible to prevent the split portion (the first portion) of the power transmission shut-off member from dropping from the power transmission device, by the stopper means, and to prevent the first portion and the second portion from interfering because the gap is provided.

In a seventh aspect of the present invention, the elastic member is a disc spring, rubber, or a coil spring in any one of the above-mentioned first to sixth aspects.

According to the present aspect, an aspect is disclosed in which the elastic member is further described.

In an eighth aspect of the present invention, the rotary part comprises a hub (2) in any one of the above-mentioned first to seventh aspects. The hub connects to the power transmission shut-off member and further is installed so as to be sandwiched between the power transmission shut-off member and the rotating shaft.

According to the present aspect, the present invention is further embodied by an configuration in which the rotary part comprises the hub.

In a ninth aspect of the present invention, a power transmission device (10) comprises the rotatable rotary part (1, 2) to which a rotational drive force is transmitted from a drive source and the power transmission shut-off member (3) that shuts off transmission of an excessive torque between the rotary part and the rotating shaft (4) of a device to be driven by moving in the direction toward the device to be driven and the power transmission shut-off member is threadedly coupled to the rotating shaft and can rotate together with the rotating shaft as one body. The rotating shaft is provided with a shaft contact surface (403) with which the rotary part comes into contact directly or indirectly. The power transmission device comprises an interposition preventing means which prevents the rotary part from being sandwiched between an end surface (307) of the power transmission shut-off member and the shaft contact surface even when the end surface (307) of the power transmission shut-off member on the side of the device to be driven moves in a direction toward the device to be driven.

By configuring as described above, a configuration in which the rotary part is prevented from being sandwiched between the end surface of the power transmission shut-off member and the rotating shaft is provided in the torque limiter system utilizing threaded fastening and, therefore, the shut-off of power transmission is performed smoothly and it is possible to avoid the trouble that power transmission cannot be shut-off even if the power transmission shut-off member ruptures.

In a tenth aspect of the present invention, the interposition preventing means is provided at the rotating shaft and comprises a thread part (402) for being threadedly fastened to the power transmission shut-off member and a straight part (404) provided between the thread part and the shaft contact surface (403) and not threaded or threaded in a manner different from the thread of the thread part in the above-mentioned ninth aspect.

According to the present aspect, when the end surface (307) of the power transmission shut-off member on the side of the device to be driven moves, the straight part prevents the rotary part from being sandwiched between the end surface of the power transmission shut-off member and the rotating shaft and, therefore, the shut-off of power transmission is performed without fail.

In an eleventh aspect of the present invention, a width (B) of the straight part (404) in an axial direction is greater than a thickness (A), in the axial direction, of the part (204c) at which the rotary part comes into contact with the shaft contact surface directly or indirectly in the above-mentioned tenth aspect.

According to the present aspect, the conditions of the straight part for preventing the rotary part from being sandwiched between the end surface and the rotating shaft also when the end surface of the power transmission shut-off member on the side of the device to be driven moves are pointed out explicitly.

In a twelfth aspect of the present invention, a width (B) of the straight part (404) in an axial direction is equal to or greater than a value, which is the thickness (A), in the axial direction, of a part (204c) at which the rotary part comes into contact with the shaft contact surface directly or indirectly minus a pitch of the thread part in the above-mentioned tenth aspect.

According to the present aspect, the conditions of the straight part for preventing the rotary part from being sandwiched between the end surface (307) and the rotating shaft also when the end surface (307) of the power transmission shut-off member, on the side of the device to be driven, moves are pointed out more explicitly.

In thirteenth to sixteenth aspects of the present invention, by configuring so that an interposition preventing member (80) is installed between the shaft contact surface (403) and the end surface (307) of the power transmission shut-off member as the interposition preventing means or by configuring so that a protrusion (305b) is provided on the end surface (307) of the power transmission shut-off member, the rotary part is prevented from being sandwiched between the end surface and the rotating shaft also when the end surface (307) moves. In this case, the width (B) of the interposition preventing member (80) or the protrusion (307) in the axial direction is greater than a distance (A) from the shaft contact surface (403) of the rotary part to an opposite contact surface (204e) of the rotary part.

According to these aspects, another configuration is disclosed, in which the rotary part is prevented from being sandwiched between the end surface (307) and the rotating shaft also when the end surface (307) of the power transmission shut-off member on the side of the device to be driven moves and, further, the dimensions of the preventing member in this case are described explicitly.

In a seventeenth aspect of the present invention, the protrusion extends, in the radial direction, at the inside of a part at which the rotary part comes into contact with the shaft contact surface directly or indirectly and is formed so as to be capable of coming into contact with the shaft contact surface in the above-mentioned sixteenth aspect.

According to the present aspect, the protrusion extends at the inside of the rotary part in the radial direction and comes into contact with the shaft contact surface when the end surface of the power transmission shut-off member, on the side of the device to be driven, moves and, therefore, the rotary part is prevented from being sandwiched between the end surface and the rotating shaft.

In an eighteenth aspect of the present invention, the rotary part comprises a pulley (1) and the hub (2) in any one of the above-mentioned ninth to seventeenth aspects. The pulley is rotatably supported by a housing of the device to be driven. The hub is connected to the rotating shaft via the power transmission shut-off member.

According to the present aspect, by arranging that the rotary part comprises the pulley and the hub, the present invention is further clarified.

In a nineteenth aspect, connection is made to the compressor for a vehicle air conditioner as the device to be driven in any one of the above-mentioned first to eighteenth aspects.

According to the present aspect, an aspect that further clarifies the use of the present invention is disclosed.

In a twentieth aspect of the present invention, a power transmission device (10) comprises: a rotary part (1, 2) rotatably supported by a housing of a device to be driven and to which a rotational drive force is transmitted from a drive source; a contact surface (204d) provided at the rotary part (1, 2) and capable of directly or indirectly coming into contact with a shaft contact surface (403) provided at a rotating shaft of a device to be driven; and a power transmission shut-off member (3) having a thread part (303) threadedly coupled to the rotating shaft and a flange part (302) joined to the thread part (303) via a rupture part (301, 308, 309) and pushing the contact surface (204d) toward the shaft contact surface (403) by an axial force generated by the thread part (303). In the power transmission device (10), the rupture part (301, 308, 309) ruptures due to the axial force when an excessive torque is transmitted from the rotary part (1, 2) to the rotating shaft and a restriction means (404, 80), which restricts the thread part (303) from moving toward the side of the shaft contact surface (403) beyond a predetermined range after the rupture part (301, 308, 309) has ruptured, is provided.

By configuring as described above, the restriction means (404, 80) is installed between the shaft contact surface (403) and the thread member (306) in the torque limiter system utilizing threaded fastening and, therefore, when the power transmission shut-off member operates and splits, the restriction means prevents a part of the split power transmission shut-off member (thread member) from coming into contact with the shaft contact surface and prevents the inner hub from being sandwiched between the thread member and the shaft contact surface and as a result, it is possible to avoid the trouble that power transmission cannot be shut off when the compressor seizes.

In a twentyfirst aspect of the present invention according to the twentieth aspect, the restriction means (404, 80) is a diameter-enlarged part (404) provided at a root of the thread part (402) at a rotating shaft side threadedly coupled to the thread part (303).

In a twentysecond aspect of the present invention according to the twenty first aspect, the restriction means (404, 80) is a member (80) arranged between the thread part (303) and the shaft contact surface (403) and with which the thread part (303) comes into contact with when moving beyond a predetermined range.

In the above-mentioned explanation of the present invention, symbols or numbers in the brackets () are attached in order to show a correspondence to embodiments described below.

The present invention may be more fully understood from the description of the preferred embodiments of the invention set forth below, together with the accompanying drawings.

BRIEF DESCRIPTION OF THE DRAWINGS

In the drawings:

FIG. 4 is a partially enlarged side section view of a state in which the power transmission shut-off member has operated and ruptured, in the first embodiment, showing a state in which a flange part 302 has advanced to a caulked part 204a.

DESCRIPTION OF THE PREFERRED EMBODIMENTS

Figure 1:
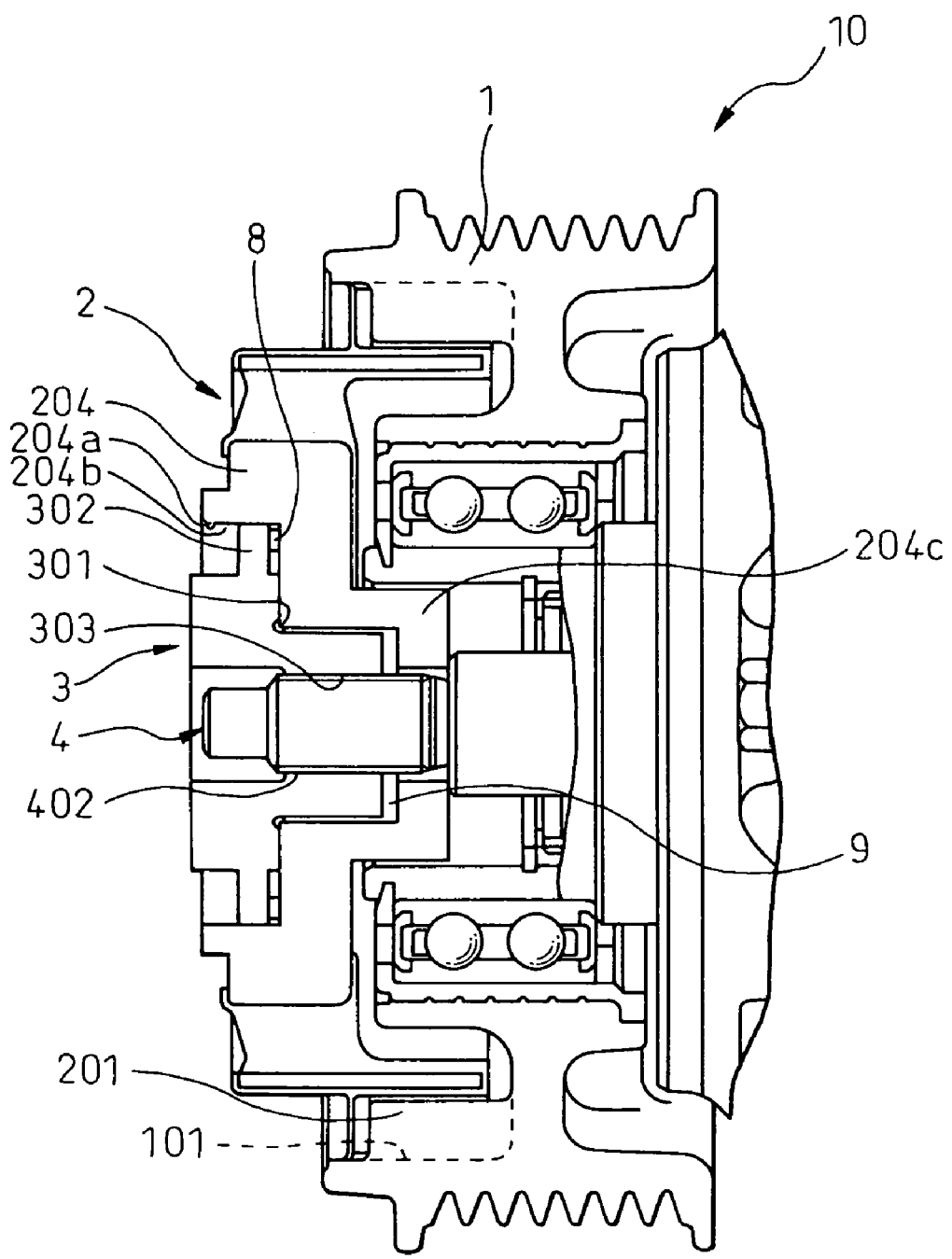
FIG. 1 is a diagrammatic side section view of a first embodiment of a power transmission device according to the present invention.
Figure 2:
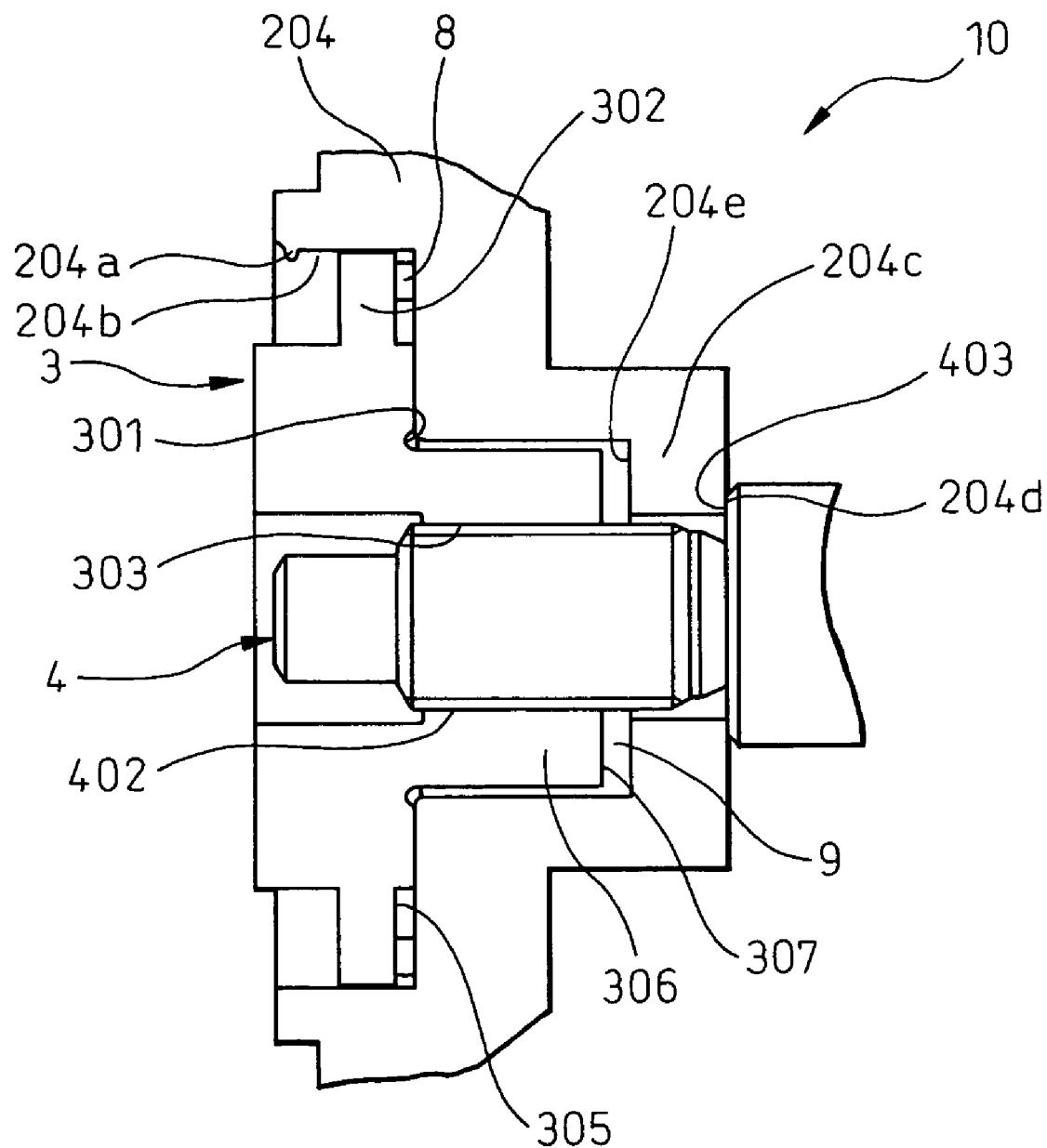
FIG. 2 is a partially enlarged side section view of the periphery of a power transmission shut-off member in FIG. 1.
Figure 3:
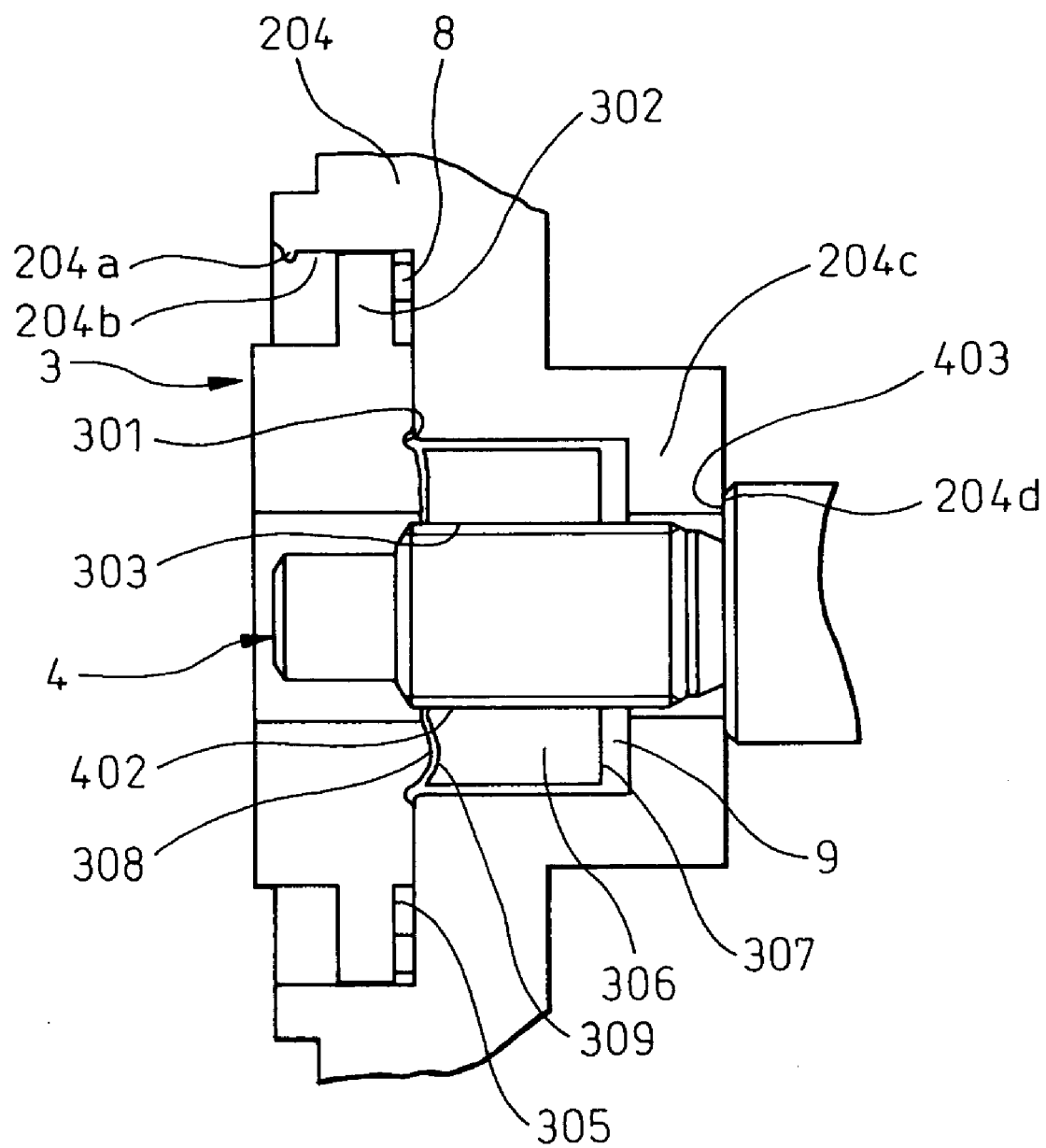
FIG. 3 is a partially enlarged side section view of a state in which the power transmission shut-off member has operated and ruptured, in the first embodiment, showing a state immediately after the rupture.
Figure 4:
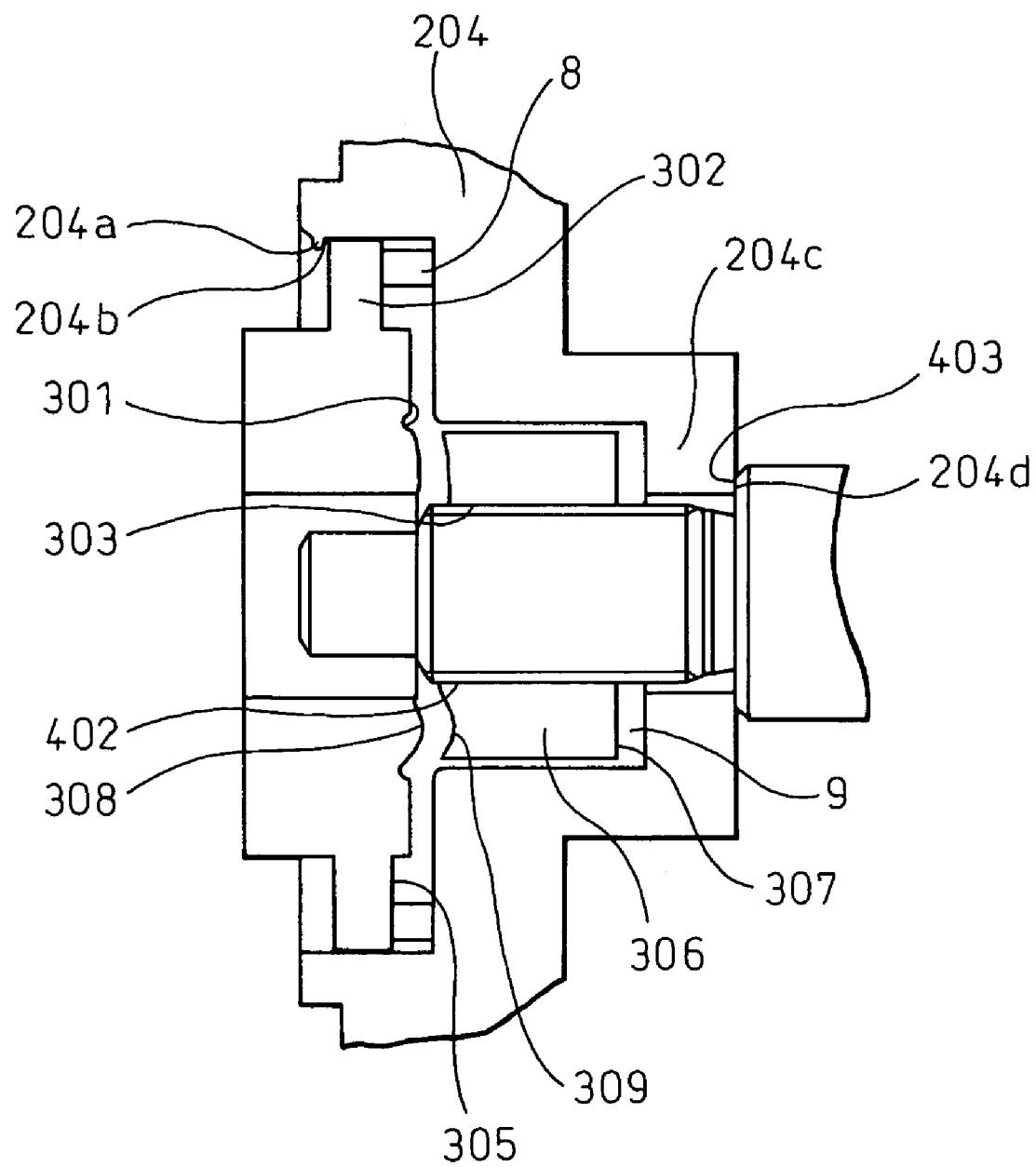
Figure 19:
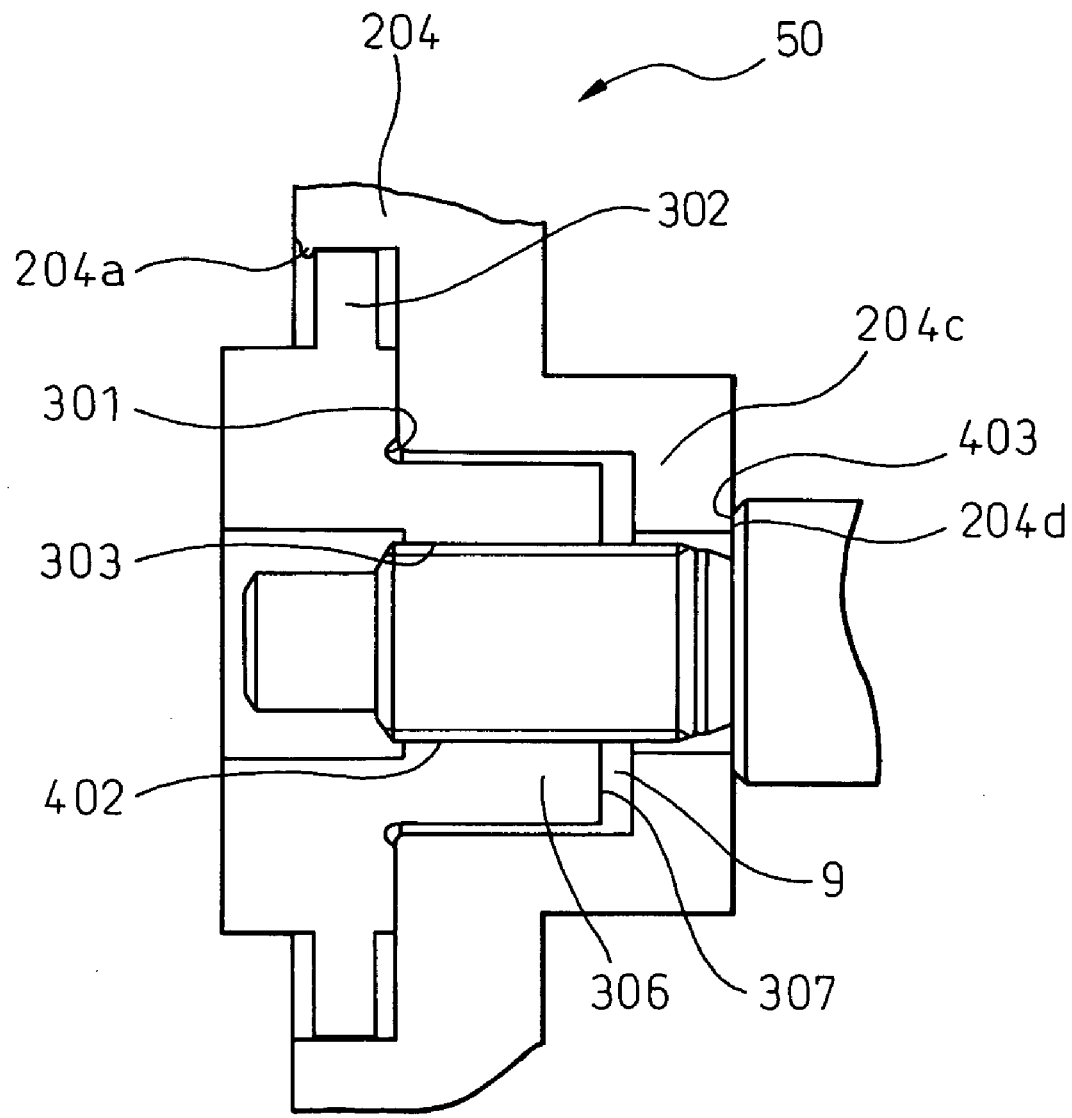
FIG. 19 is a partially enlarged side section view of the periphery of a power transmission shut-off member, similar to FIG. 2, of a power transmission device in a prior art.
Figure 20:
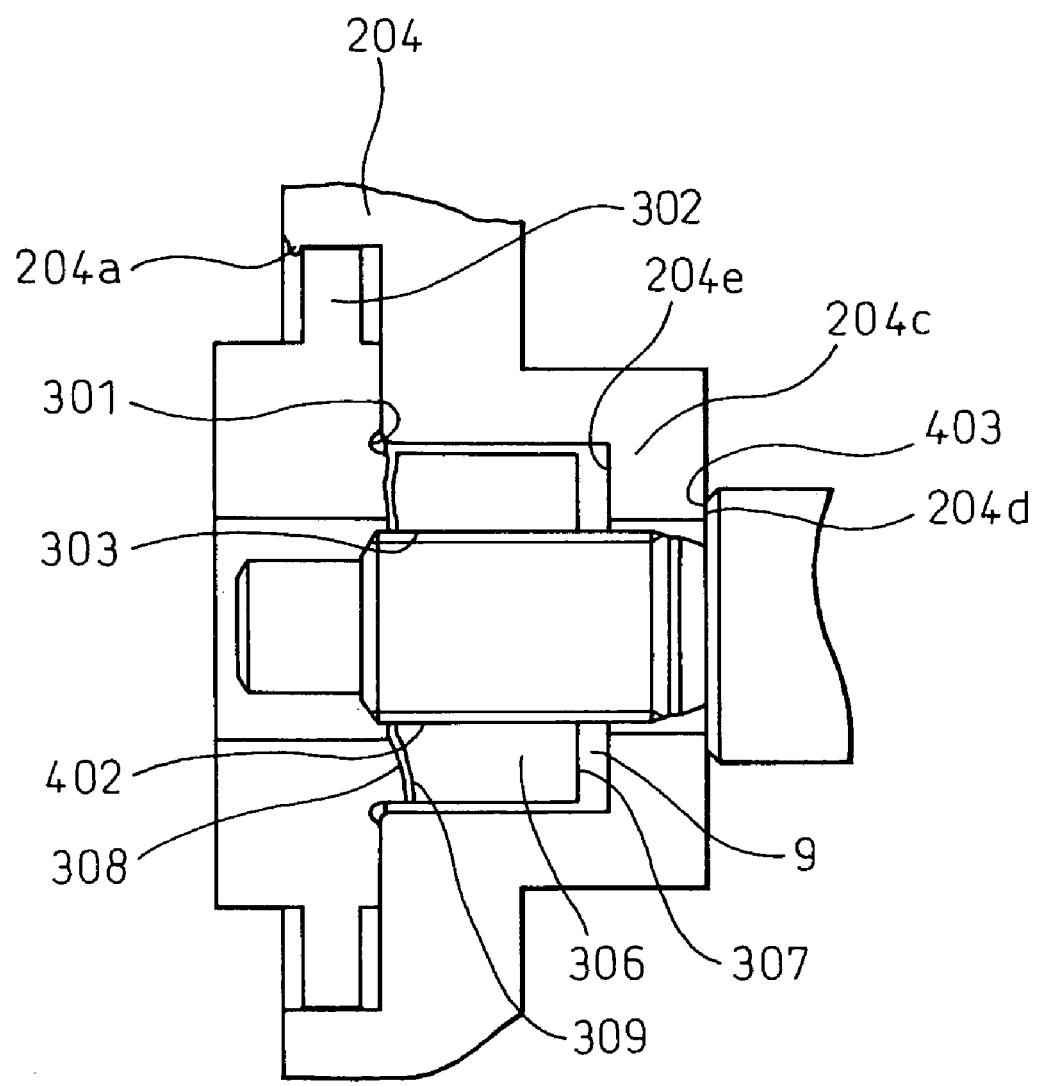
FIG. 20 is a partially enlarged side section view of a state in which the power transmission shut-off member has operated and ruptured, in the prior art in FIG. 19, showing a state immediately after the rupture.
Figure 21:
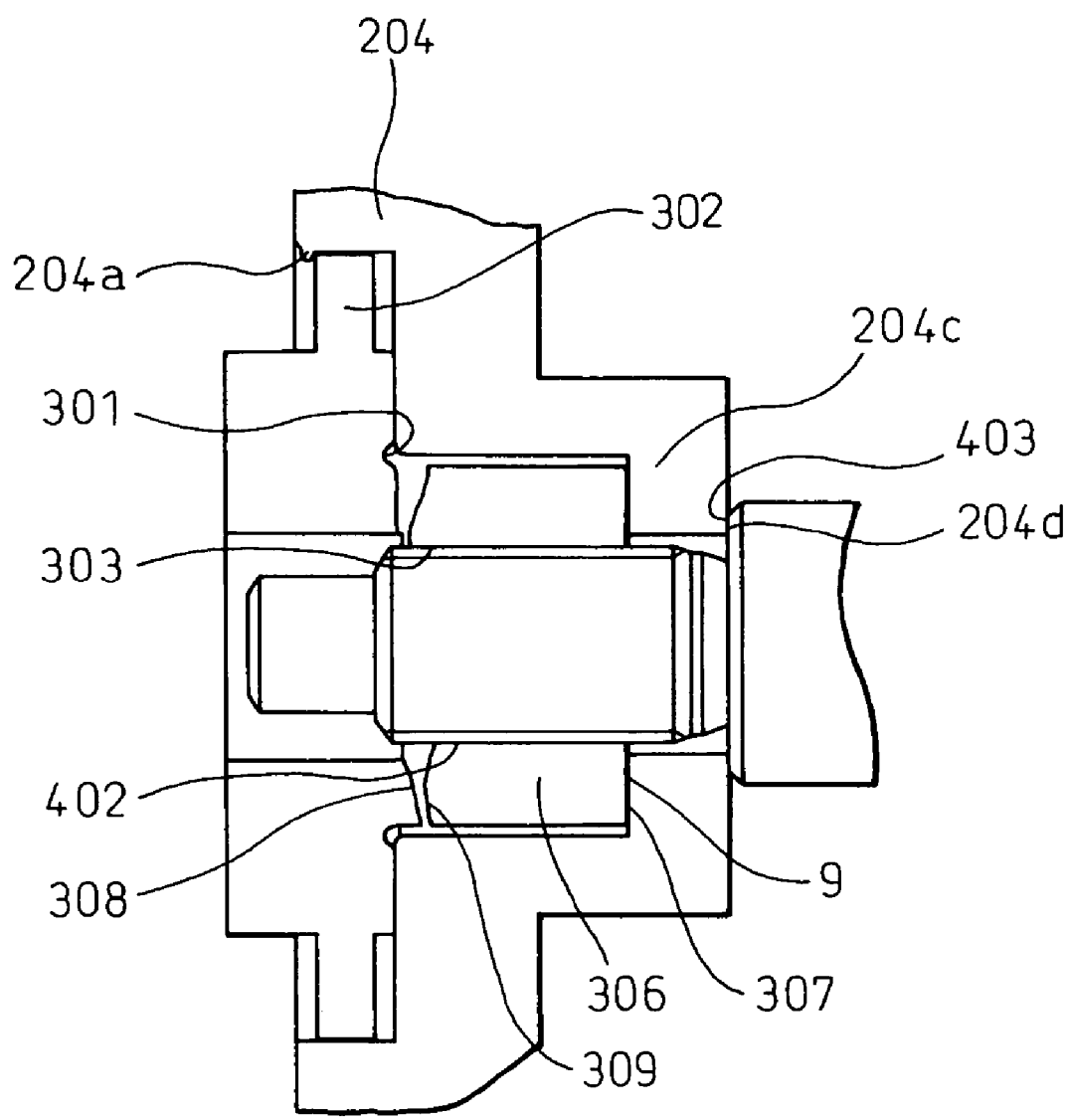
FIG. 21 is a partially enlarged side section view of a state in which the power transmission shut-off member has operated and ruptured in the prior art in FIG. 19, showing a state in which a thread member (306) has advanced to the hub bearing.

Embodiments of a power transmission device according to the present invention will be described below, in detail, based on the drawings. FIG. 1 shows a diagrammatic side section view of a first embodiment of the power transmission device according to the present invention and FIG. 2 is a partially enlarged side section view of the periphery of a power transmission shut-off member in FIG. 1. FIG. 3 and FIG. 4 are partially enlarged side section views of two states in which the power transmission shut-off member has operated and ruptured in the first embodiment. The symbols of the components in FIG. 1 to FIG. 4 correspond to the symbols of the similar components in the conventional example in FIG. 19 to FIG. 21.

A power transmission device 10 in the first embodiment of the present invention shown in FIG. 1 is used in an air conditioner for vehicle, a device for transmitting a torque of an external drive source such as an engine to a compressor of an air conditioner, comprising a power transmission shut-off member (torque limiter) 3. In the power transmission device 10, rotational power from the outside is transmitted to a pulley 1 via a belt etc., not shown schematically, and transmitted to an inner hub 204 of a hub 2 by the insertion of a concave/convex part 201, constituted by an elastic member installed on the outer periphery of the hub 2, into a concave/convex part 101 of the pulley. The configuration of the pulley side concave/convex part 101 and the hub side concave/convex part 201 may be, for example, one in which a plurality of corresponding concave/convex parts are inserted into each other. Power is further transmitted from the hub 2 to the power transmission shut-off member 3 and in the present embodiment, the inner hub 204 and the power transmission shut-off member 3 are inserted into each other by a spigot insertion (insertion connection such as inserting a pipe into a socket) at the insertion part of the inner hub and the insertion part of the power transmission shut-off member. Here, the pulley 1 and the hub 2 correspond to the rotary part in claims.

Torque transmission between the inner hub 204 and the power transmission shut-off member 3 may be performed by, for example, the spigot insertion between the hexagonal insertion part, which is the outer periphery of a flange part 302 of the power transmission shut-off member 3, and the hexagonal insertion part of the hub 2 or by the caulked structure of a rotation stopper, not shown schematically. Alternatively, the torque may be transmitted by the spigot insertion with a shape other than a circle, such as a quadrangle, a width-across flat, a hexagon, an octagon, a decagon, or a dodecagon, or by the fastening by threads installed on the inner hub 204 and the power transmission shot-off member 3, although not shown schematically in the present embodiment. The power transmitted from the hub 2 to the power transmission shut-off member 3 is transmitted from the power transmission shut-off member 3 to a rotating shaft 4 of a compressor (not shown) threadedly coupled to the power transmission shut-off device 3 to rotationally drive the compressor.

In FIG. 2, the inner hub 204 and the power transmission shut-off member 3 are fastened to each other by the axial force generated by the threaded coupling of a thread part 303 of the power transmission shut-off member and a thread part 402 of the rotating shaft 4 of the compressor. The load of the fastening in the axial direction is supported by a hub bearing 204c of the inner hub 204 and a hub contact surface 204d of the hub 2 and an shaft contact surface 403 of the rotating shaft 4 are in contact with each other. An end surface 307 of the power transmission shut-off member 3 on the compressor (or rotating shaft) side and a hub opposite contact surface 204e of the hub bearing 204c of the inner hub 204 are provided with a gap "B" 9 in between and are in opposition to each other via the gap "B" 9. On a backside 305 (between the flange part 302 of the power transmission shut-off member 3 and the inner hub 204) of the flange part 302 of the power transmission shut-off member 3, disc springs 8 are installed and the hub 204 is set with a caulked part 204a (stopper means in claims) for preventing the flange part 302 from dropping in the axial direction. Between the flange part 302 and the caulked part 204a, a gap "A" (space) 204b is set.

FIG. 3 and FIG. 4 are diagrams for explaining a state after the power transmission shut-off member (torque limiter) 3 in FIG. 2 of the first embodiment has operated. In FIG. 2, if the power transmission shut-off member 3 operates and ruptures at a rupture part 301, the power transmission shut-off member 3 separates into the flange part 302 and a thread member 306 (the first portion and the second portion in the claims). The surfaces of the rupture part 301 are not necessarily flat planeshaped, as is the case in the conventional example and, therefore, there may be a case where a rupture surface 308 on the flange side comes into contact with a rupture surface 309 on the thread member side and they interfere with each other. At this time, the split thread member 306 is rotated and tends to advance in the axial direction (toward the compressor side). However, the gap "A" 204b is set between the flange part 302 and the caulked part 204a and, therefore, the flange part 302 can readily move to within the gap "A" 204b and is pushed and moved in the direction toward the front end part of the rotating shaft 4 until it comes into contact with the caulked part 204a due to the repulsive force of the disc springs 8 installed on the backside 305 of the flange part 302 of the power transmission shut-off member 3 (due to the resistance force generated at the thread coupling in which the thread member 306 is threadedly coupled to the rotating shaft 4 and the thread member 306 is not rotated) (refer to FIG. 4). Thus, as shown, for example, in FIG. 2, the disc springs 8 exert a repulsive force on the power transmission shut-off member 3 and the rotating shaft 4 in a direction to separate the rotating shaft 4 and the power transmission shut-off member 3. The repulsive force exerted on the rotating shaft 4 by the disc springs 8 is applied indirectly through the inner hub 204 due to the contact between the inner hub 204 and the shaft contact surface 403.

When the power transmission shut-off member 3 (torque limiter) operates, the flange part 302 is not constrained and, therefore, is pushed forward (in the direction toward the front end of the rotating shaft) by the disc springs 8 and moved to the caulked part 204a of the inner hub 204. Due to this, the flange part 302 becomes more distant from the rupture surface 309 of the thread member 306 of the split power transmission shut-off member 3 and thereby, is unlikely to couple again with the thread member 306 of the power transmission shut-off member 3 and thus the power transmission is shut off without fail. In the present embodiment, movement of the thread member 306 in the direction of sandwiching the hub 2 is restricted, the gap "B" 9 is maintained without sandwiching the hub bearing 204c, and it is possible for the hub bearing 204c to rotate idly because the rotation is not constrained. The hub bearing 204c of the inner hub 204 is not sandwiched by the thread member 306 of the power transmission shut-off member 3 and the stepwise shaft contact surface 403 of the rotating shaft 4 and, therefore, the axial force by the threaded coupling of the power transmission shut-off member 3 and the rotating shaft 4 does not act on the inner hub 204. Thus the power transmission is completely shut off.

Figure 5:
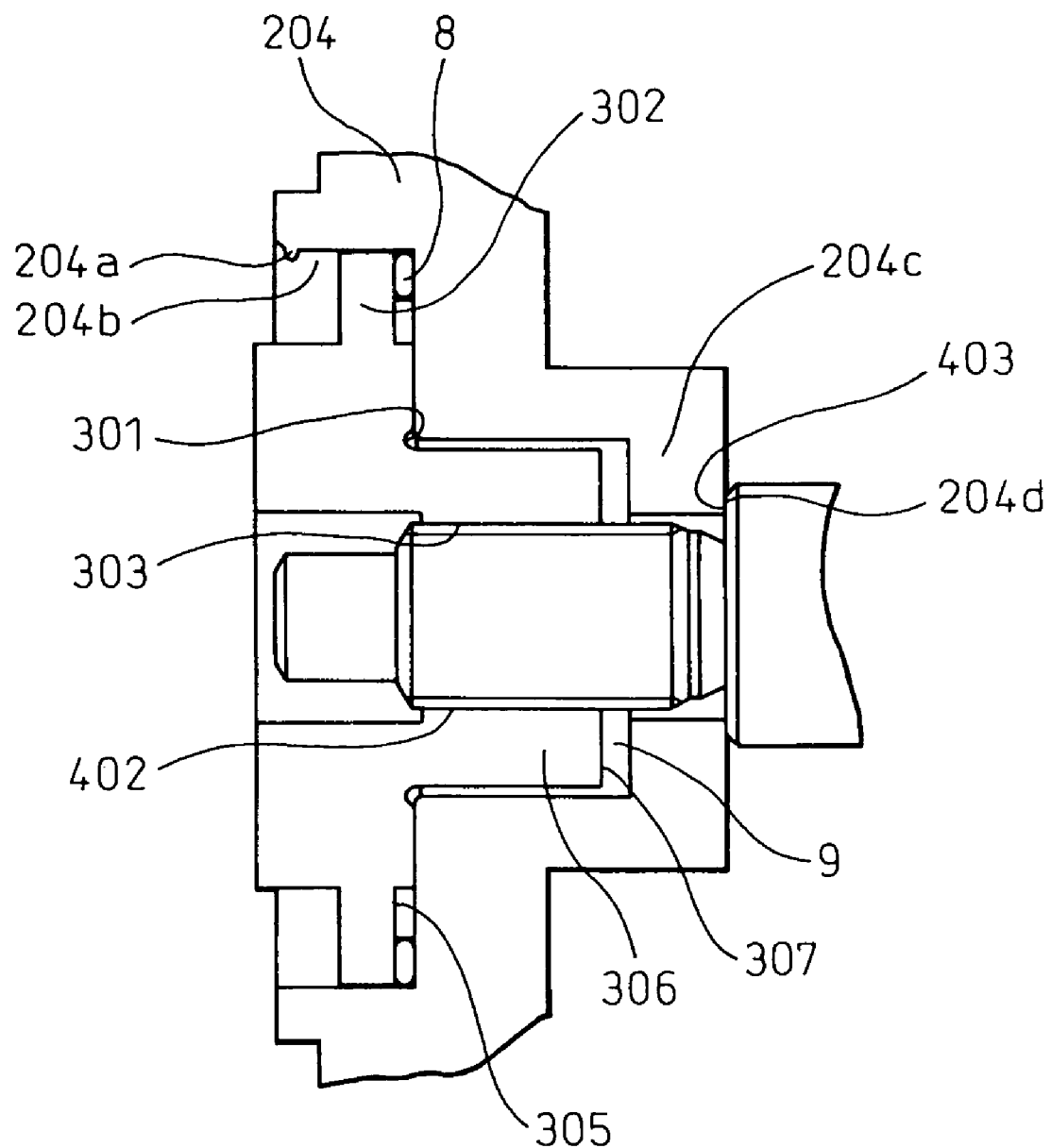
FIG. 5 is a partially enlarged side section view, similar to FIG. 2, in a second embodiment of the power transmission device according to the present invention.

FIG. 5 is a partially enlarged side section view of the power transmission device in a second embodiment of the present invention, corresponding to FIG. 2. In the above-mentioned first embodiment, the disc springs are installed on the backside of the flange part 302, however, the present invention is not limited to this and an elastic member other than the disc springs, for example, an elastic member 8 such as rubber may be installed. Further, although not shown schematically, the same effect can be obtained also with a material or part, such as a coil spring etc., having a mechanism extensible in a free state.

As configurations of the second embodiment other than those mentioned above are fundamentally the same as those in the first embodiment, an explanation is omitted.

Figure 6:
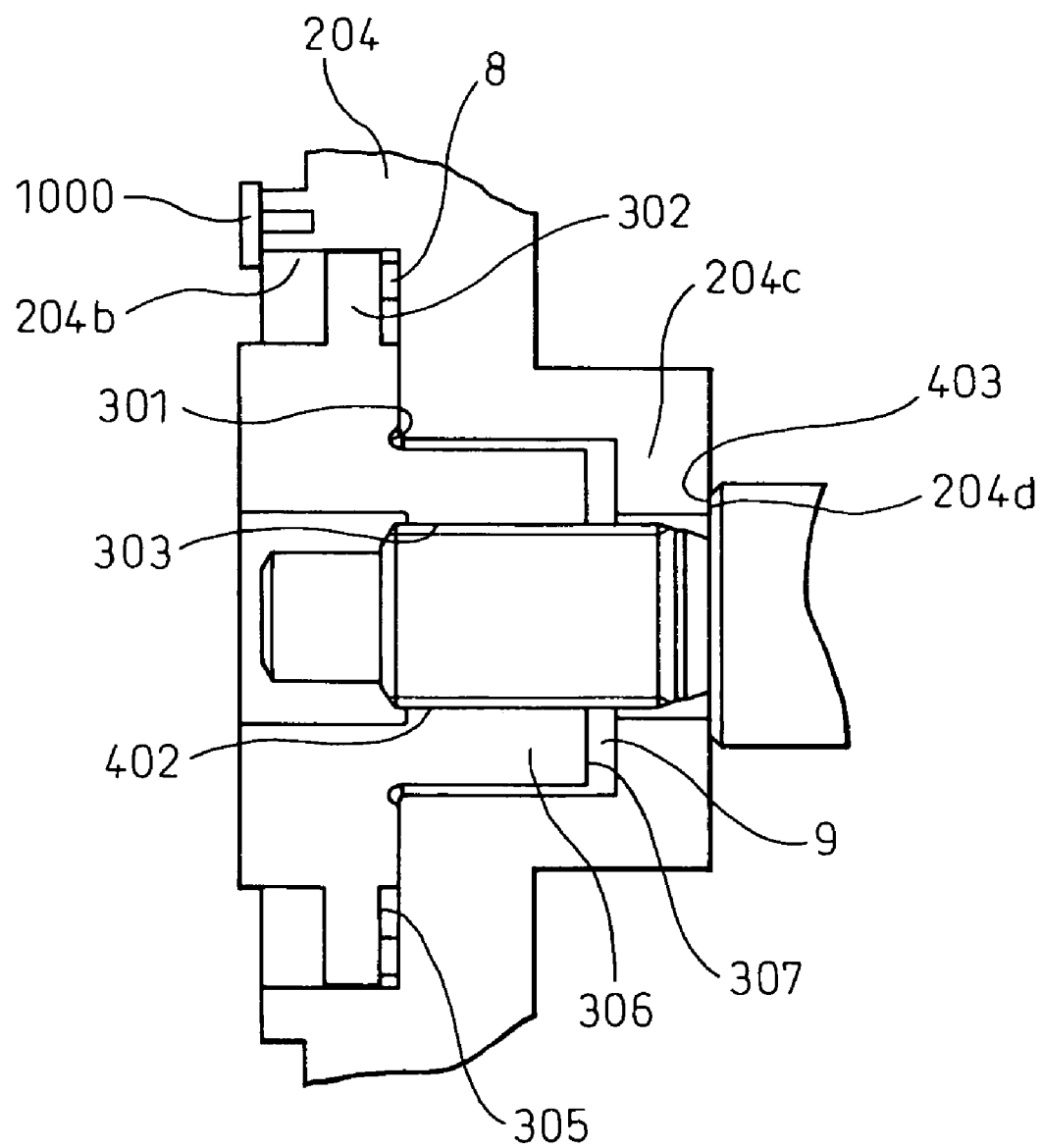
FIG. 6 is a partially enlarged side section view, similar to FIG. 2, in a third embodiment of the power transmission device according to the present invention.

FIG. 6 is a partially enlarged side section view of the power transmission device in a third embodiment of the present invention, corresponding to FIG. 2. In the present embodiment, instead of the caulked structure by the caulked part 204a in the above-mentioned first embodiment, a stopper structure (means) that prevents the flange part 302 from dropping in the axial direction by a rivet (or rivets) 1000 is adopted. With this configuration also, the same effect can be obtained.

As configurations of the third embodiment other than those mentioned above are fundamentally the same as those in the first embodiment, an explanation is omitted.

Figure 7:
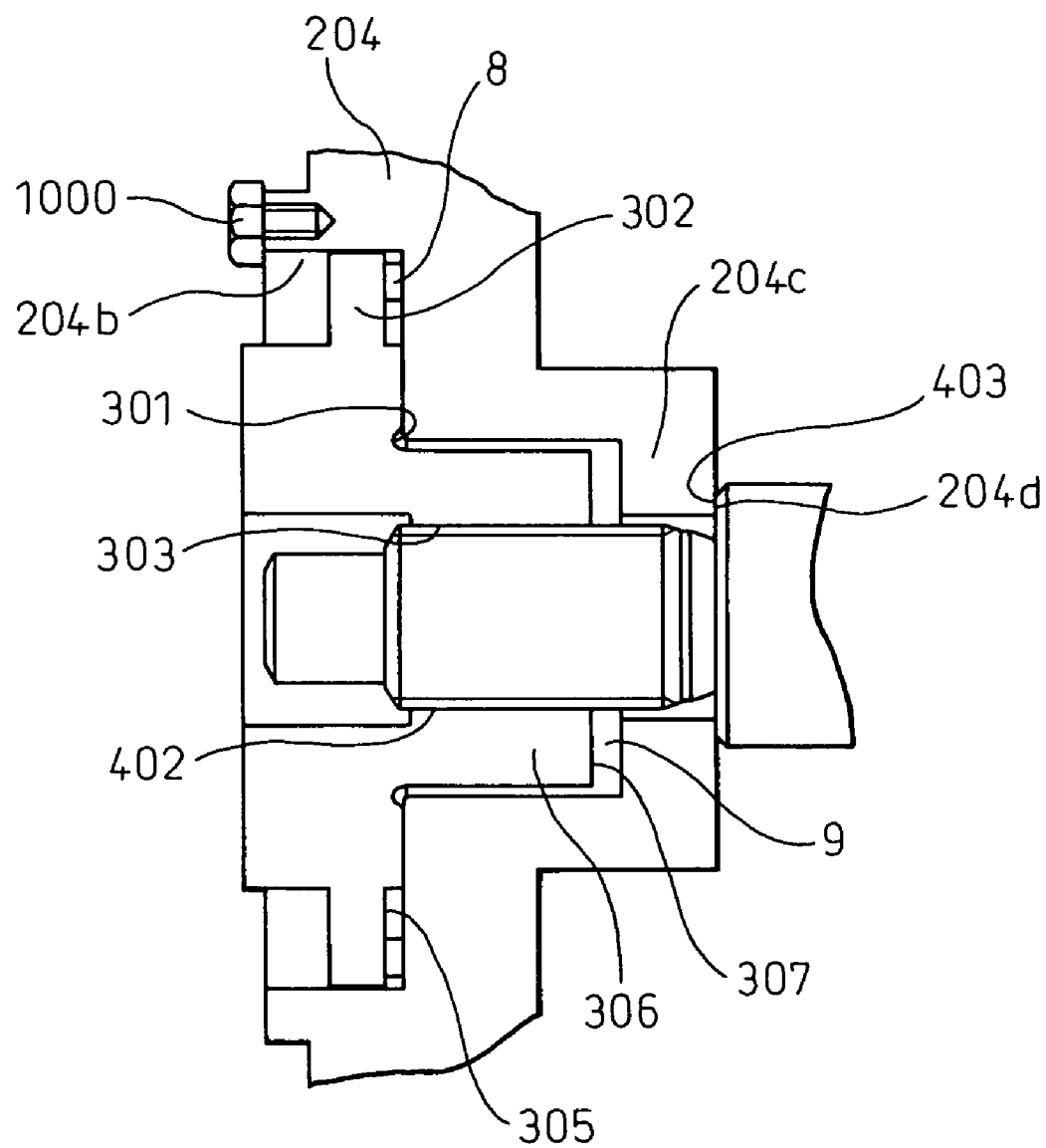
FIG. 7 is a partially enlarged side section view, similar to FIG. 2, in a fourth embodiment of the power transmission device according to the present invention.

FIG. 7 is a partially enlarged side section view of the power transmission device in a fourth embodiment of the present invention, corresponding to FIG. 2. In the present embodiment, instead of the caulked structure in the first embodiment and the rivet structure in the second embodiment mentioned above, a stopper structure that prevents the flange part 302 from dropping in the axial direction by a bolt (or bolts) 1000 is adopted. With this configuration also, the same effect can be obtained.

As configurations of the fourth embodiment other than those mentioned above are fundamentally the same as those in the first embodiment, an explanation is omitted.

With respect to the drawings in the above-mentioned second to fourth embodiments, that is, referring to FIG. 5 to FIG. 7, the components in FIG. 5 to FIG. 7 which are the same as or similar to the components in the first embodiment disclosed in FIG. 1 to FIG. 4 are assigned with the same reference symbols.

Figure 8:
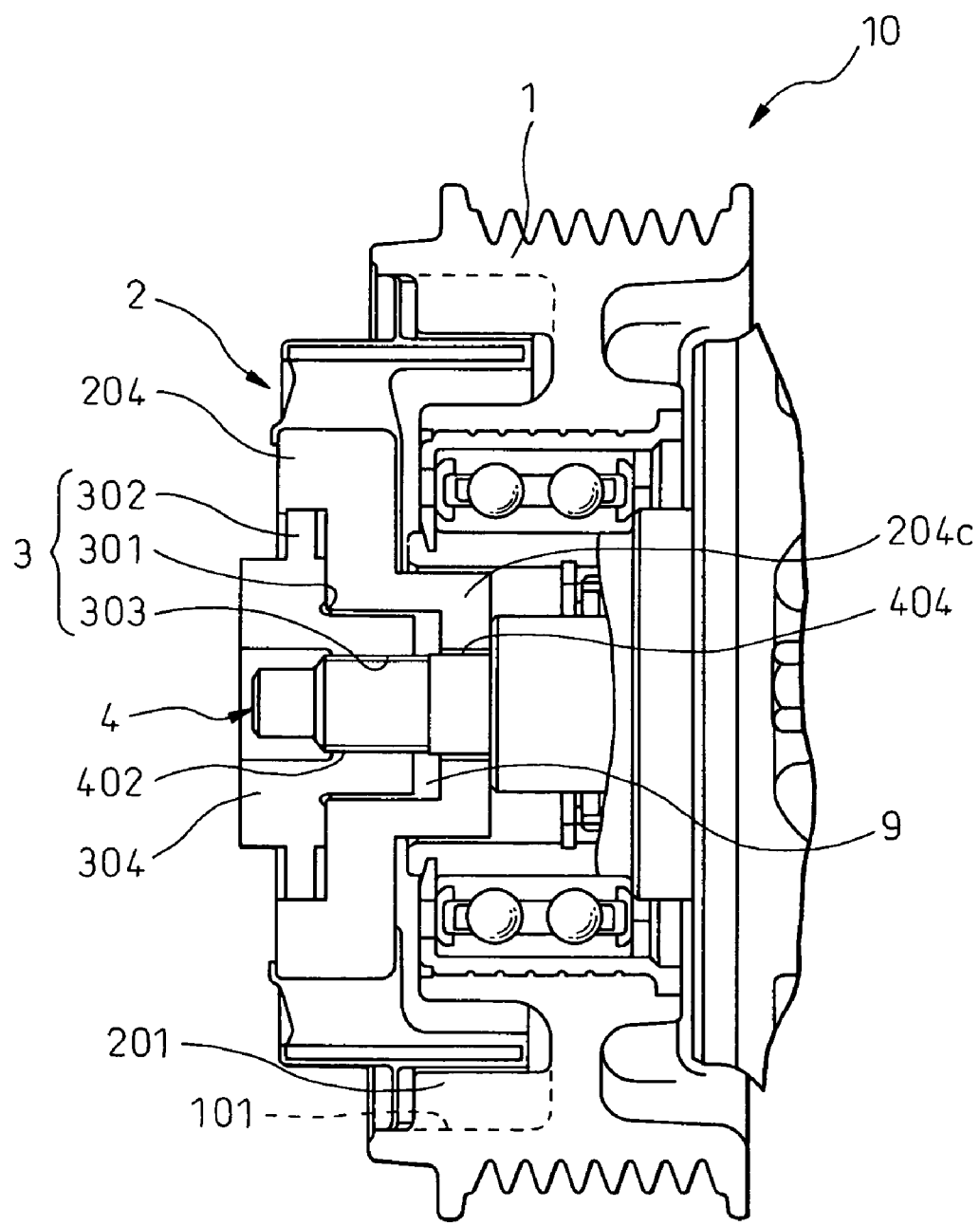
FIG. 8 is a diagrammatic side section view of a fifth embodiment of the power transmission device according to the present invention.
Figure 9:
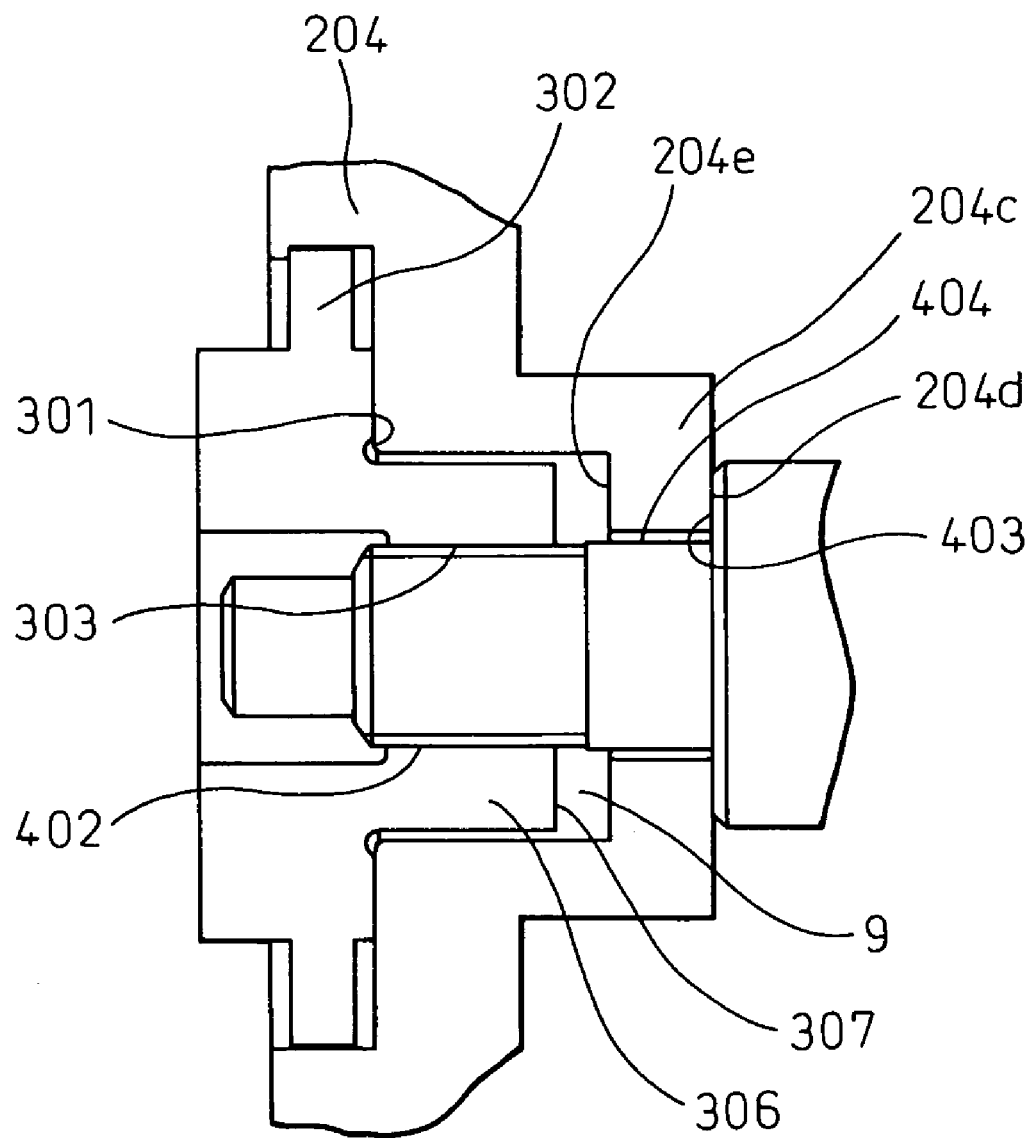
FIG. 9 is a partially enlarged side section view of the periphery of the power transmission shut-off member in FIG. 8.
Figure 10:
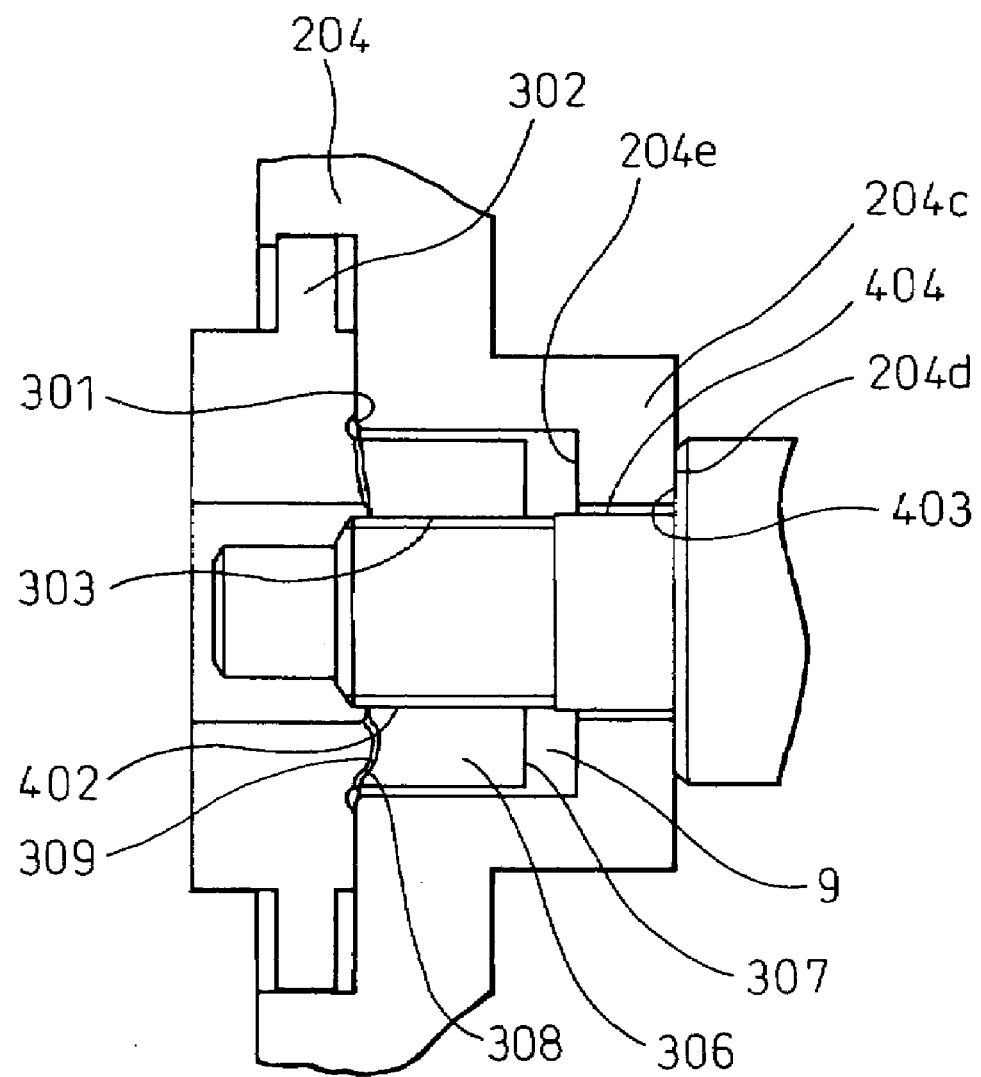
FIG. 10 is a partially enlarged side section view of a state in which the power transmission shut-off member has operated and ruptured, in the fifth embodiment, showing a state immediately after the rupture.
Figure 11:
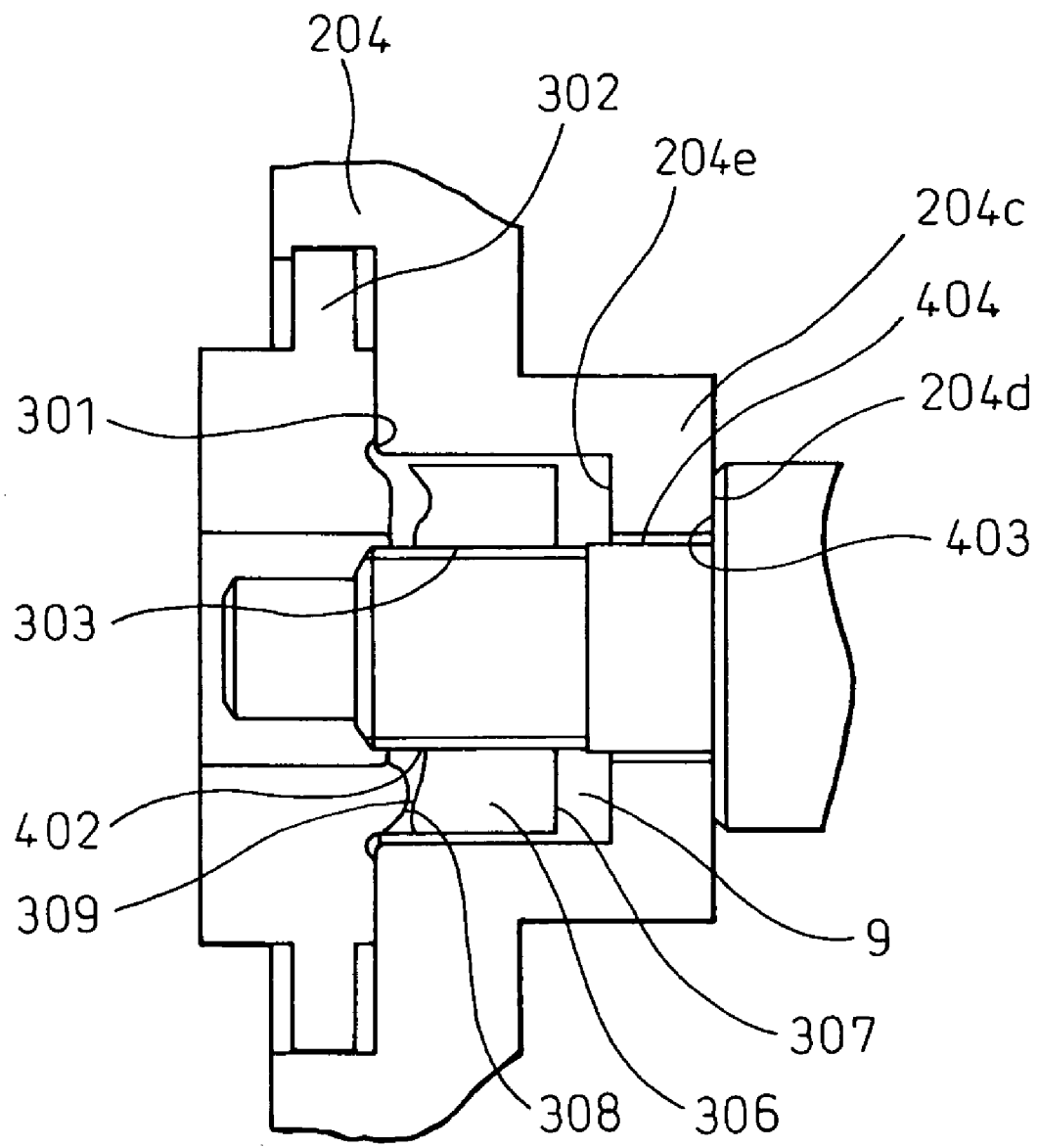
FIG. 11 is a partially enlarged side section view of a state in which the power transmission shut-off member has operated and ruptured, in the fifth embodiment, showing a state in which a thread member (305) has advanced to a hub bearing (204c).
Figure 12:
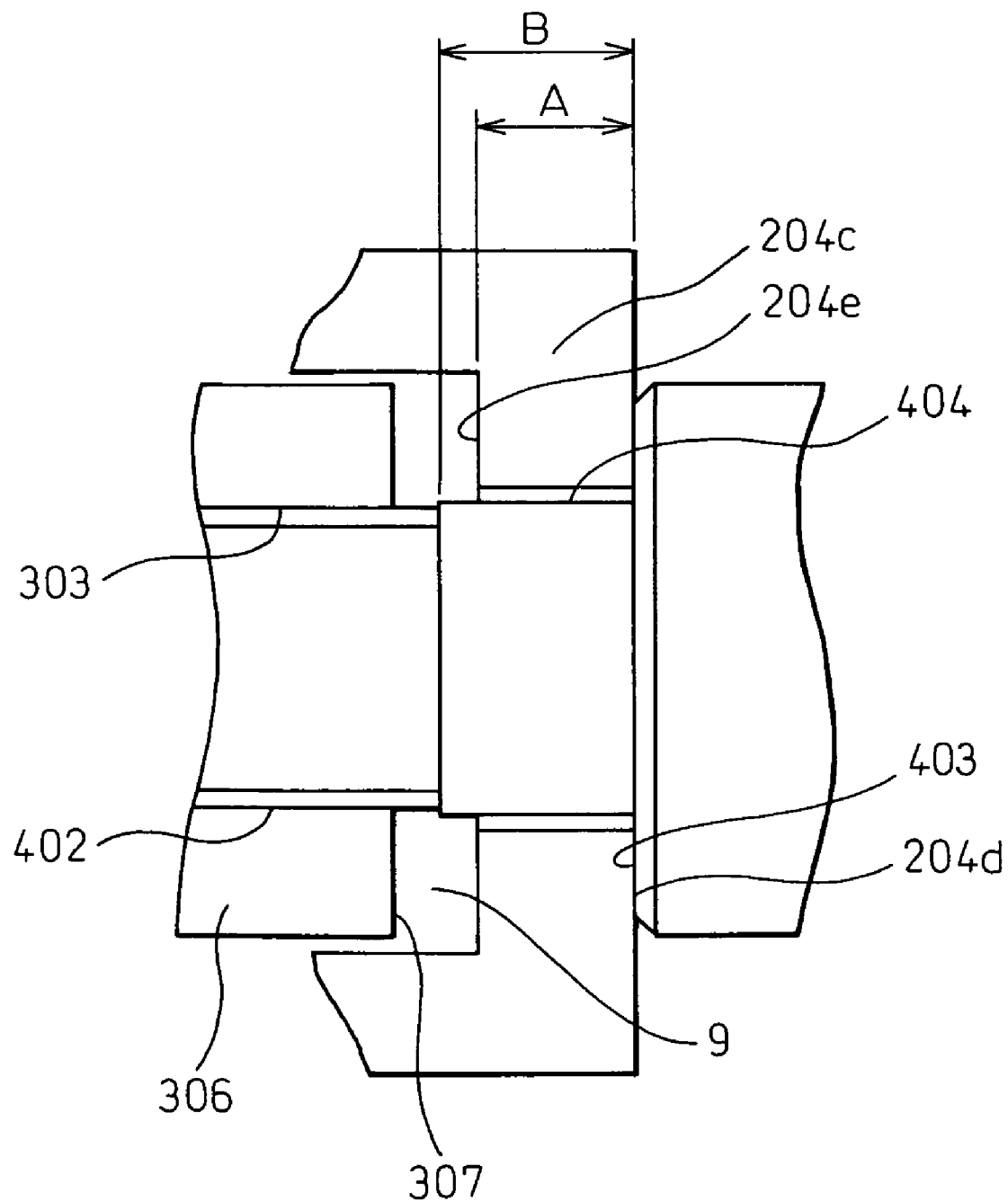
FIG. 12 is a diagram for explaining conditions for the fifth embodiment to hold.

FIG. 8 shows a diagrammatic side section view of a fifth embodiment of the power transmission device according to the present invention and FIG. 9 is a partially enlarged side section view of the periphery of the power transmission shut-off member in FIG. 8. FIG. 10 and FIG. 11 are partially enlarged side section views of two states in which the power transmission shut-off member has operated and ruptured in the fifth embodiment. FIG. 12 is a diagram for explaining conditions which the present invention requires in the fifth embodiment. The symbols of the components in FIG. 8 to FIG. 12 correspond to the symbols of the same components in the conventional example in FIG. 19 to FIG. 21.

In FIG. 9, the inner hub 204 and the power transmission shut-off member 3 are fastened to each other by the axial force generated by the threaded coupling of the thread part 303 of the power transmission shut-off member and the thread part 402 of the rotating shaft 4 of the compressor. The load of the fastening in the axial direction is supported by the hub bearing 204c of the inner hub 204, and the hub contact surface 204d of the hub 2 and a shaft contact surface 403 of the rotating shaft 4 are in contact with each other. The end surface 307 of the power transmission shut-off member 3 on the compressor (or rotating shaft) side and the hub opposite contact surface 204e of the hub bearing 204c of the inner hub 204 are set with a gap 9 in between and are in opposition to each other across the gap 9. At the rotating shaft 4 of the compressor, the straight part 404 (corresponding to the interposition preventing means in claims), including a part not threaded or an imperfectly threaded part, is installed. Between the end surface 307 and the hub opposite contact surface 204e, a boundary between the thread part 402 of the rotating shaft 4 and the straight part 404 exists. In other words, the straight part 404 extends toward the side of the power transmission shut-off member 3 beyond the hub opposite contact surface 204e of the hub bearing 204c.

FIG. 10 and FIG. 11 are diagrams for explaining a state after the power transmission shut-off member (torque limiter) 3 in FIG. 9 of the fifth embodiment has operated. In FIG. 9, if the power transmission shut-off member 3 operates and ruptures at the rupture part 301, the power transmission shut-off member 3 separates into the flange part 302 and the thread member 306. The surfaces of the rupture part 301 are not necessarily flat plane-shaped, as is the case in the conventional example and, therefore, there may be a case where the flange side rupture surface 308 comes into contact with the rupture surface 309 on the thread member side and rotates the rupture surface 309. When rotated, the split thread member 306 advances in the axis direction (toward the compressor side) and tends to sandwich the hub bearing 204c. However, as the straight part 404 is installed at the rotating shaft 4, even if the thread member 306 advances in the direction toward the compressor in FIG. 4, further movement in the direction toward the compressor is blocked by the straight part 404, after reaching the straight part 404. Movement is restricted before the hub 2 is sandwiched, the gap 9 is maintained without sandwiching the hub bearing 204c, and it is possible for the hub bearing 204c to rotate idly because the rotation is not constrained. As the straight part 404 is provided as shown in FIG. 11, the hub bearing 204c of the inner hub 204 is not sandwiched by the thread member 306 of the power transmission shut-off member 3 and the stepwise shaft contact surface 403 of the rotating shaft 4, and therefore, the axial force by the threaded coupling of the power transmission shut-off member 3 and the rotating shaft 4 does not act on the inner hub 204 and thus power transmission is completely shut off.

FIG. 12 is a diagram for explaining the conditions for the present embodiment to work, showing the dimensions of the straight part 404. A relationship of a width B of the straight part 404 with respect to a thickness A of the hub bearing 204c is expressed by $B \geq A$—[a length corresponding to one turn of the thread pitch] (for example, a relation $B \geq A$—1.25 when the thread pitch is 1.25). The straight part 404 has a diameter greater than the root diameter of the thread part 402 of the rotating shaft. Further, the straight part 404 has a shape or specifications different from the thread shape or specifications of the power transmission shut-off member 3 (different in pitch, different in a size and for example, when the thread part is M10 and has a pitch of 1.25, a thread of M10 and 1.0 pitch or thread of M12 and 1.25 pitch may be acceptable for the straight part).

Figure 13:
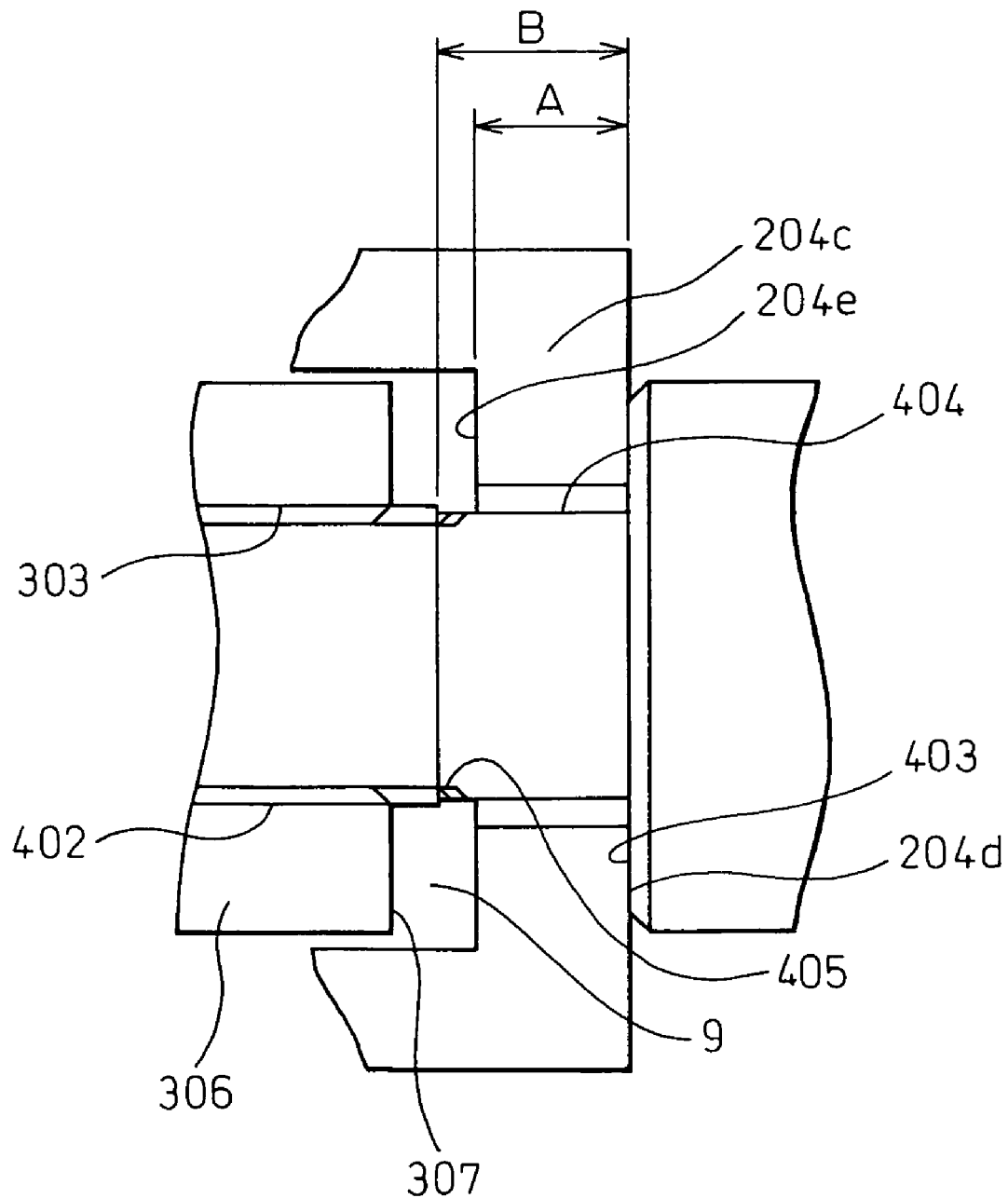
FIG. 13 is a partially enlarged side section view of the periphery of a hub bearing in a sixth embodiment of the power transmission device according to the present invention.

FIG. 13 is a partially enlarged side section view of the power transmission device in a sixth embodiment of the present invention, corresponding to FIG. 9. The present embodiment is an embodiment in which the straight part in the above-mentioned fifth embodiment includes an imperfect thread part 405 and, in this embodiment also, the same effect can be obtained. A relationship of a width B of the imperfect thread part 405 with respect to the thickness A of the hub bearing 204c is expressed by $B \geq A$—[a length corresponding to one turn of the thread pitch].

As configurations of the sixth embodiment other than those mentioned above are fundamentally the same as those in the fifth embodiment, an explanation is omitted.

Figure 14:
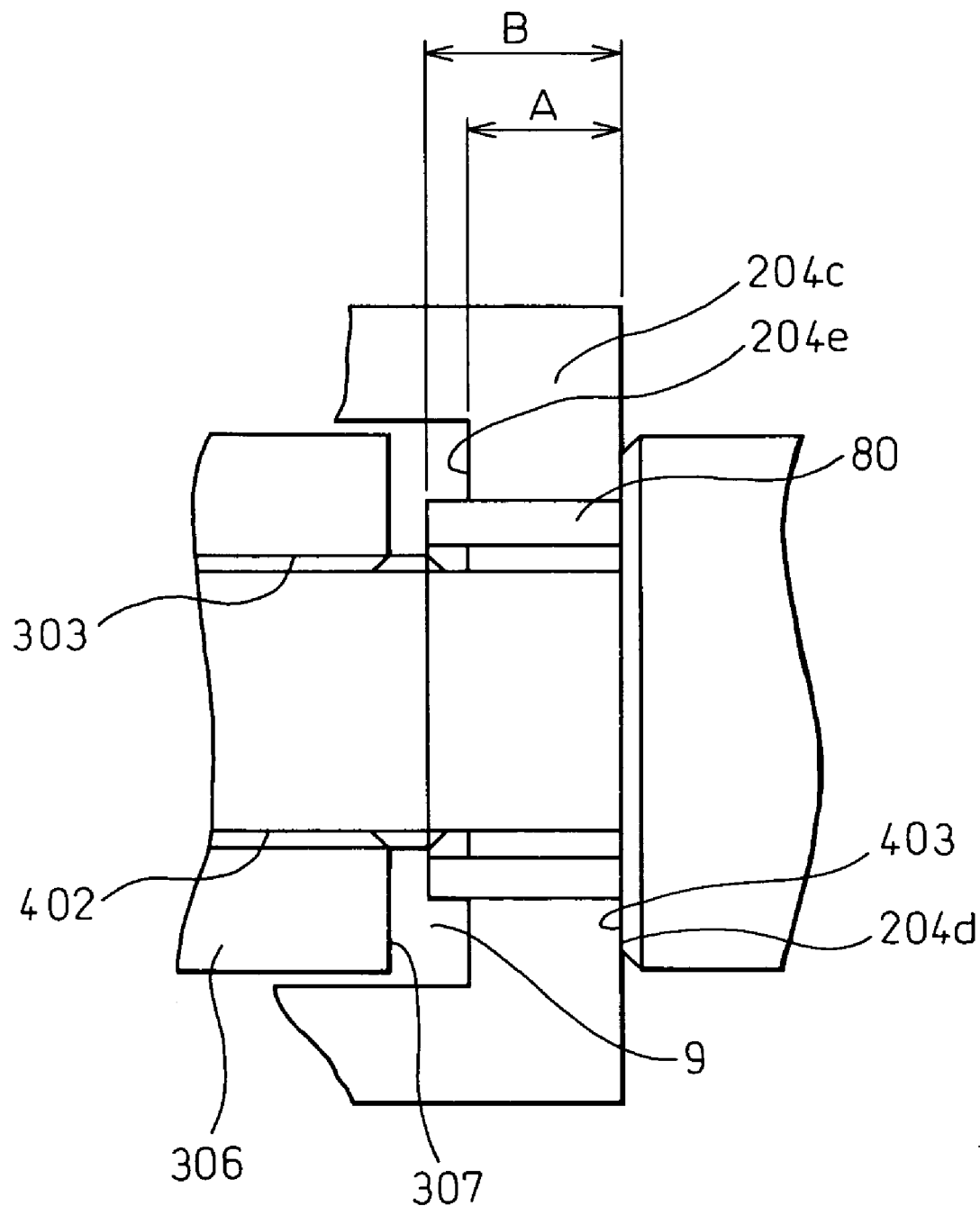
FIG. 14 is a partially enlarged side section view of the periphery of a hub bearing in a seventh embodiment of the power transmission device according to the present invention.
Figure 15:
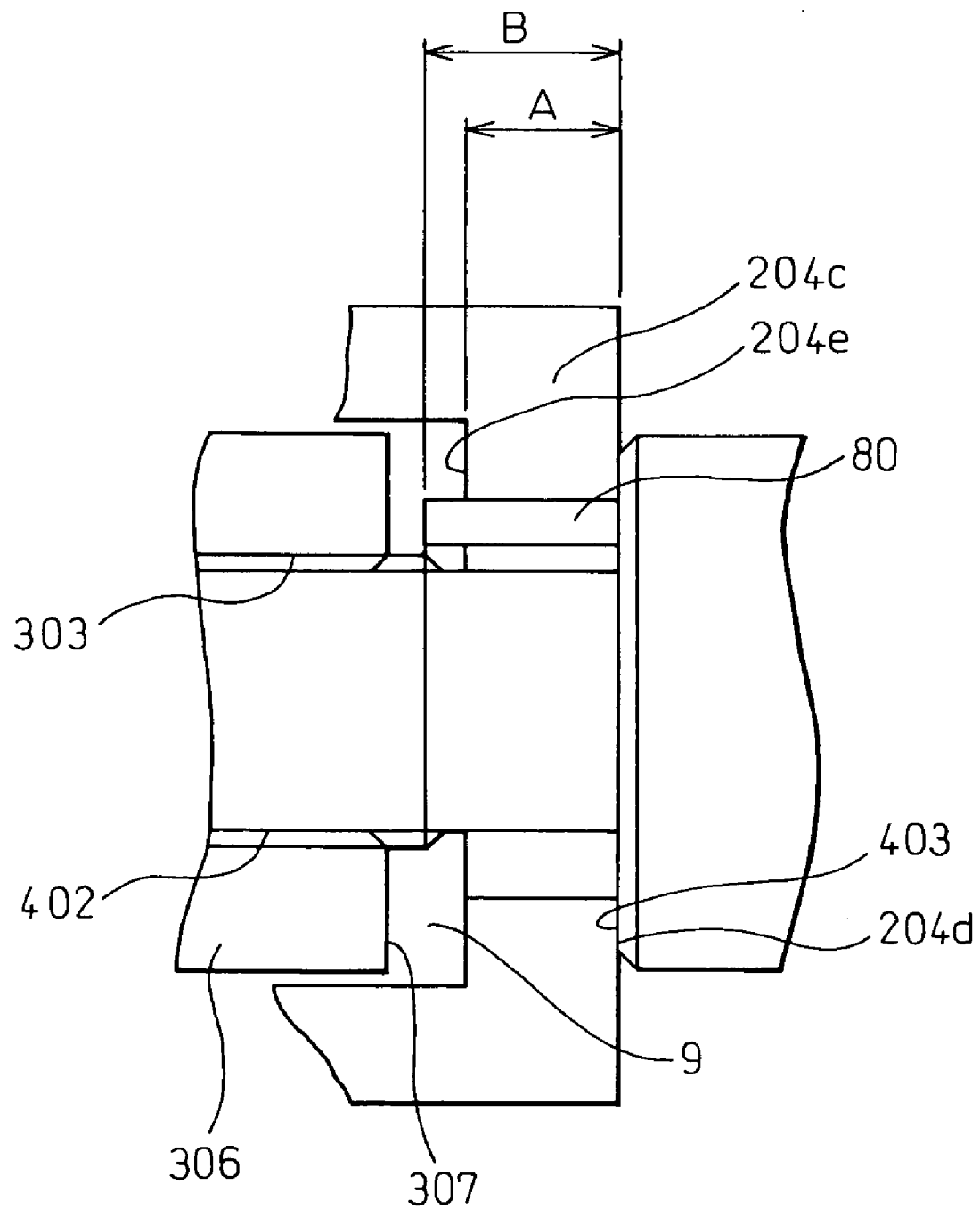
FIG. 15 is a partially enlarged side section view of the periphery of a hub bearing in a modification example of the seventh embodiment of the power transmission device according to the present invention.

FIG. 14 and FIG. 15 are partially enlarged side section views of the power transmission device in a seventh embodiment of the present invention and in its modification example, respectively, corresponding to FIG. 9. FIG. 14 is an example in which an interposition preventing member (ring) 80 having a ring-shape, which is separate from the hub 2, is installed. The ring 80 may be an annular member separate from the rotating shaft 4 and may have a structure in which a thread is cut on the outer periphery. Further, as shown in FIG. 15, it may be at least one or more rod-shaped members 80 instead of a ring. In other words, with the separate member (rod-shaped member) 80 that forms a state as shown in FIG. 15, in which the hub bearing 204c is not sandwiched by the shaft contact surface 403 of the rotating shaft and the thread member 306 of the power transmission shut-off member 3, the same effect can be obtained. Here, a relationship of the width B of the ring (or the rod-shaped member) 80 with respect to the thickness A of the hub bearing 204c is expressed by $B > A$.

As configurations of the seventh embodiment and its modification example, other than those mentioned above, are fundamentally the same as those in the first embodiment, an explanation is omitted.

Figure 16:
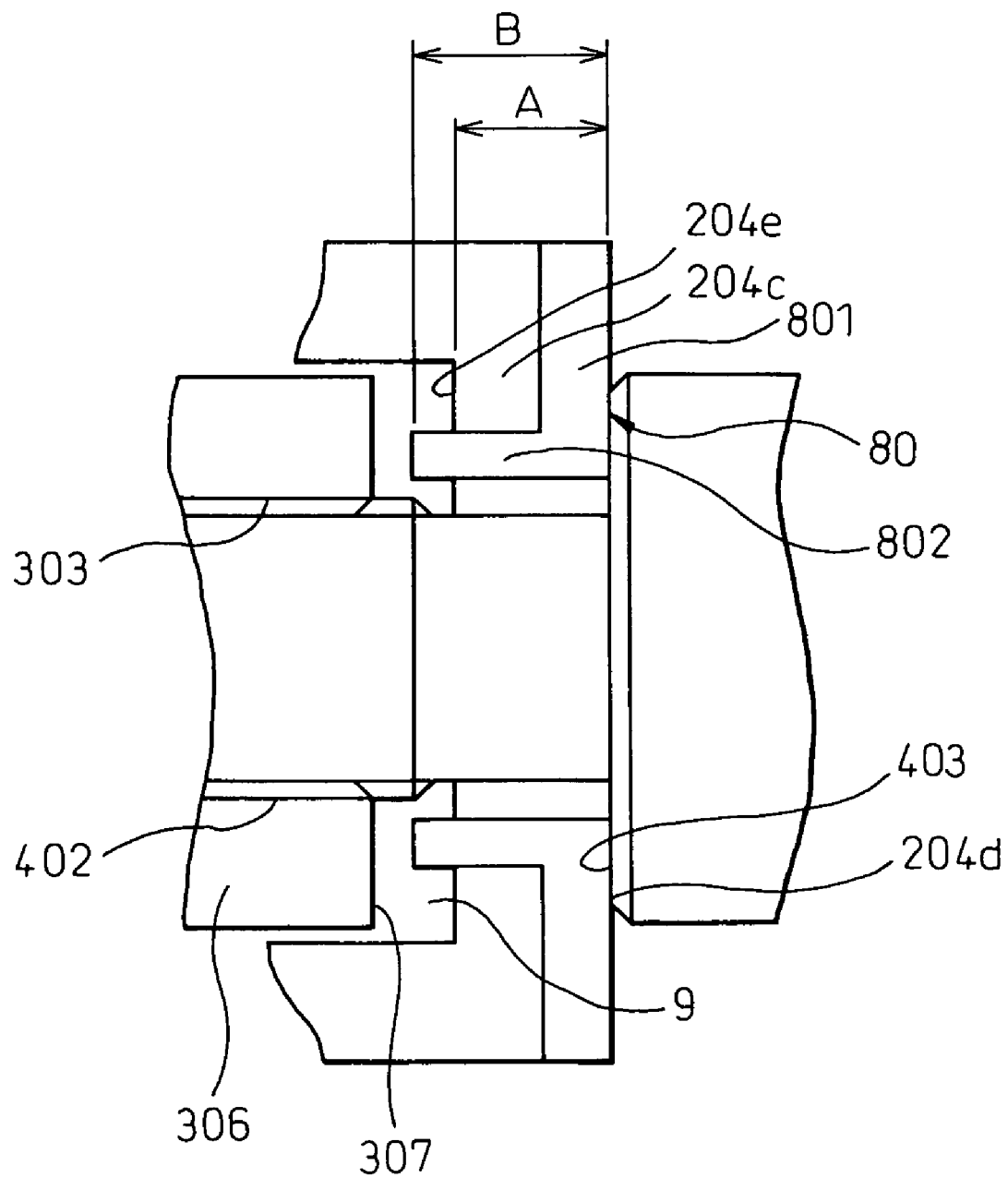
FIG. 16 is a partially enlarged side section view of the periphery of a hub bearing in an eighth embodiment of the power transmission device according to the present invention.

FIG. 16 is a partially enlarged side section view of the power transmission device in an eighth embodiment of the present invention, corresponding to FIG. 9. In FIG. 16, a washer ring 8 (corresponding to the interposition preventing member in claims), which is a part separate from the hub 2 and corresponds to the ring in the above-mentioned seventh embodiment, is provided. As shown in FIG. 16, the washer ring 80 has an L-shaped section and is sandwiched by the hub bearing 204c of the inner hub 204 and the shaft contact surface 403 of the rotating shaft 4, also functioning as a washer. In this case also, the same effect can be obtained. Here, as shown in FIG. 16, a relationship of the width B of a ring portion 802 of the washer ring 80 with respect to a total value A of the thickness of the hub bearing 204c and the thickness of a plate-like washer portion 801 of the washer ring 80 is expressed by $B > A$.

As configurations of the eighth embodiment other than those mentioned above are fundamentally the same as those in the fifth embodiment, an explanation is omitted.

Figure 17:
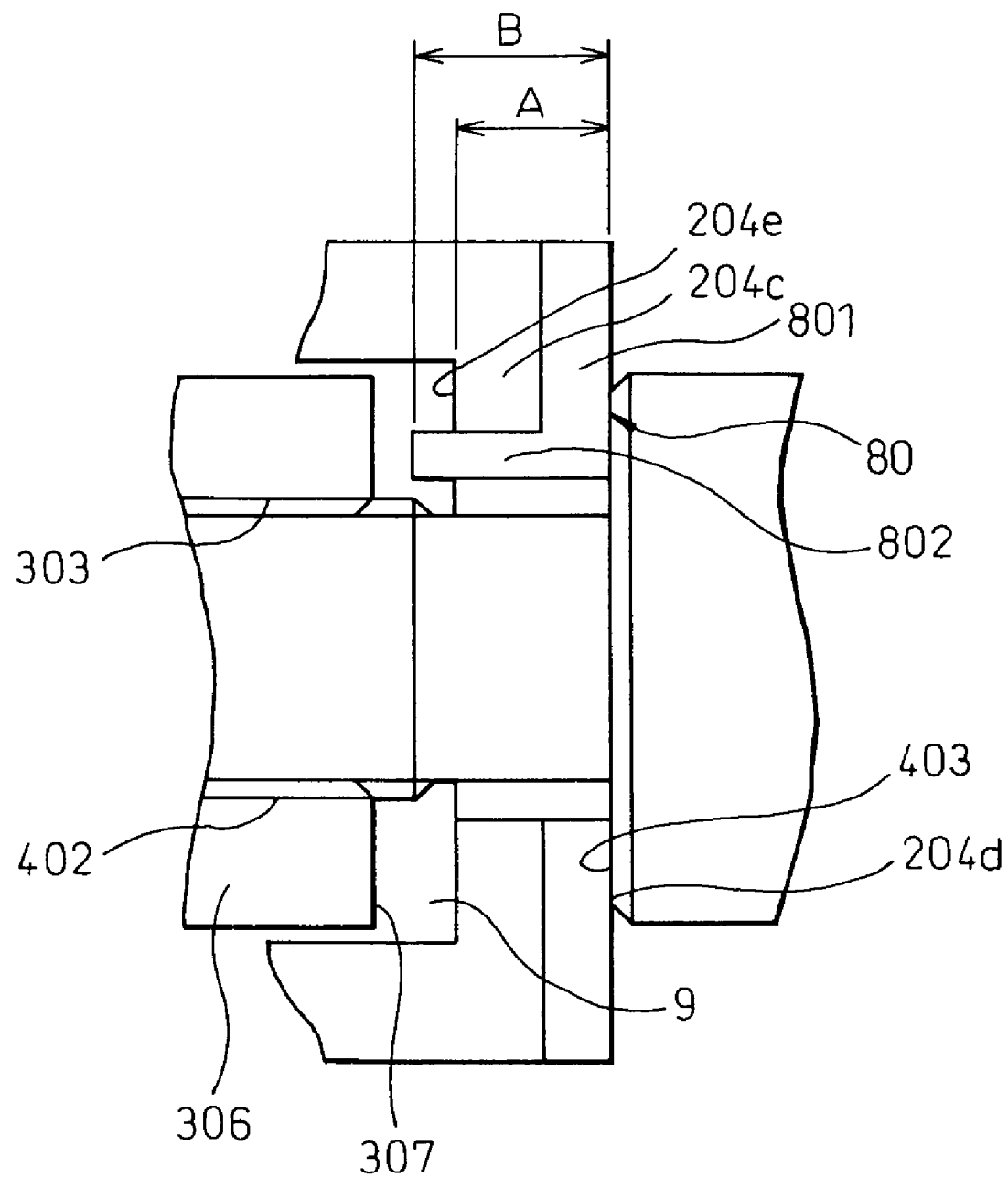
FIG. 17 is a partially enlarged side section view of the periphery of a hub bearing in a ninth embodiment of the power transmission device according to the present invention.

FIG. 17 is a partially enlarged side section view of the power transmission device in a ninth embodiment of the present invention, corresponding to FIG. 9. FIG. 17 is an example in which a ring-shaped flange member 80 (corresponding to the interposition preventing member in claims), which is a part separate from the hub 2, is installed between the shaft contact surface 403 of the rotating shaft 4 and the hub bearing 204c of the inner hub 204 in the axial direction of the rotating shaft 4. The flange member 80 comprises at least one or more protrusions 802. The protrusion 802 protrudes toward the side of the power transmission shut-off member beyond the hub opposite contact surface 204e of the hub bearing 204c and, therefore, functions in the same manner as that of the ring in the above-mentioned seventh embodiment and thus the same effect can be obtained. Here, as shown in FIG. 17, a relationship of the width B of the protrusion 802 of the flange member 80 with respect to a total value A of the thickness of the hub bearing 204c and the thickness of a plate-like portion 801 of the flange member 80 is expressed by B>A.

As configurations of the ninth embodiment other than those mentioned above are fundamentally the same as those in the fifth embodiment, an explanation is omitted.

Figure 18:
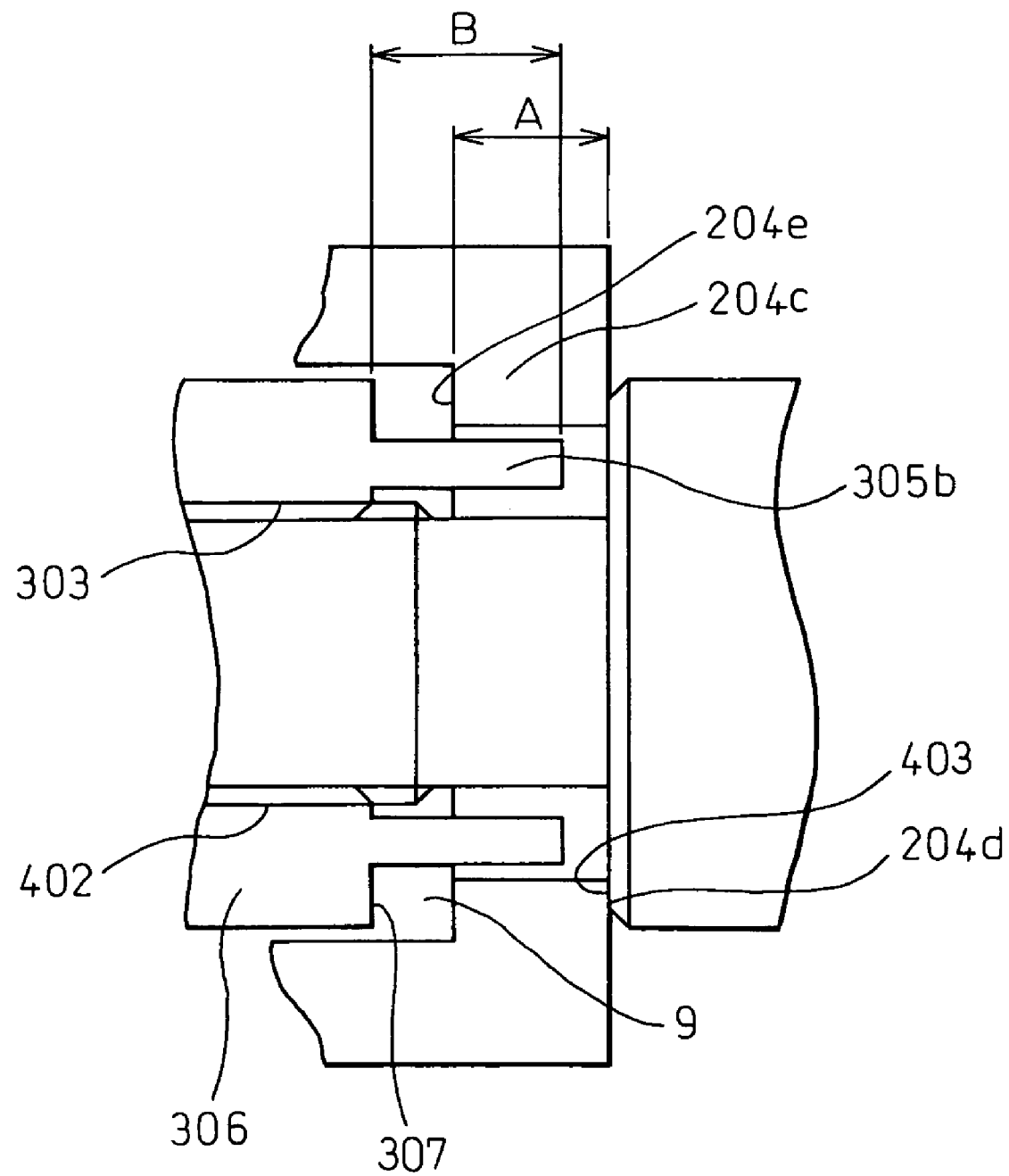
FIG. 18 is a partially enlarged side section view of the periphery of a hub bearing in a tenth embodiment of the power transmission device according to the present invention.

FIG. 18 is a partially enlarged side section view of the power transmission device in a tenth embodiment of the present invention, corresponding to FIG. 9. As shown in FIG. 18, even if at least one or more protrusions 305b having a shape that penetrates into the inside of the hub bearing 204c in the radial direction and protrudes from the bottom surface 305a of the thread member 306 of the power transmission shut-off member, are installed, a structure is possible that restricts the thread member 306 from advancing toward the side of the compressor when the power transmission shut-off member ruptures. The relation between the thickness A of the hub bearing 204c and the height (or width) B of the protrusion 305b is B>A.

As configurations of the tenth embodiment other than those mentioned above are fundamentally the same as those in the fifth embodiment, an explanation is omitted.

With respect to the drawings of the above-mentioned sixth to tenth embodiments, that is, referring to FIG. 13 to FIG. 18, the components in FIG. 13 to FIG. 18 which are the same as or similar to the components in the fifth embodiment disclosed in FIG. 8 to FIG. 12 are specified by the same reference symbols.

Next, the effect and function of the above-mentioned embodiments are explained.

The following effect can be expected from the power transmission device in the first embodiment of the present invention.

In the torque limiter system utilizing a threaded fastening, the power transmission device has a structure comprising: the inner hub to which power is transmitted from the pulley; and the power transmission shut-off member coupled to the inner hub in the direction of rotation and installed so as to be capable of moving within at least a distance of the gap in the axial direction by providing a stopper means, i.e. a caulked part, and the elastic member, that is, the disc spring, is installed on the backside of the flange part of the power transmission shut-off member. Therefore, a configuration can be obtained in which the flange part separates from the thread member by a repulsive force of a spring etc. when the torque limiter operates, and as a result, the trouble that power cannot be shut off because of the re-fastening of the power transmission shut-off member can be avoided and power transmission can be shut off, without fail, when the compressor seizes.

The same effect as the effect in the above-mentioned embodiment can be expected from the power transmission device in the second to fourth embodiments of the present invention.

The following effect can be expected from the power transmission device in the fifth embodiment of the present invention.

In the torque limiter system utilizing threaded fastening, the straight part is provided at the rotating shaft and in the case of rupture, the thread part of the power transmission shut-off member is prevented from coming into contact with the hub bearing of the inner hub, thereby, power is shut off smoothly and the trouble that power transmission cannot be shut off even if the power transmission shut-off member ruptures can be avoided.

The same effect as the effect in the above-mentioned fifth embodiment can be expected from the power transmission device in the sixth to tenth embodiments of the present invention.

In the above-mentioned embodiments, an example in which the present invention is used as a power transmission device for the compressor of an air conditioner for a vehicle is shown, however, the present invention may be applied to a use other than this and the application of the present invention is not limited to use in an air conditioner for a vehicle.

In the above description or in the embodiments shown in the accompanied drawings, the power of the drive source is explained by a configuration in which power is transmitted via a belt or pulley, however, the present invention is not limited to this and for example, power may be transmitted via another mechanism such as a gear wheel.

In the above description or in the embodiments shown in the accompanied drawings, for example, in the first and second embodiments, a configuration is such that the disc spring 8 and the caulked part 204a, and the elastic member 8 and the caulked part 204a are combined, however, a configuration may be accepted in which the elastic member 8 and the rivet 1000 in the third embodiment are combined, that is, various combinations of an elastic member such as a disc spring and a stopper means such as a caulked part may be employed.

The above-mentioned embodiments are examples of the present invention and in no case is the present invention limited by the embodiments. It is specified only by the items described in claims and various embodiments, other than those mentioned above, are possible.

While the invention has been described by reference to specific embodiments chosen for the purposes of illustration, it should be apparent that numerous modifications could be made thereto, by those skilled in the art, without departing from the basic concept and scope of the invention.

The invention claimed is:

1. A power transmission device comprising:
    a rotatable rotary part to which a rotational drive force is transmitted from a drive source; and
    a power transmission shut-off member that shuts off transmission of an excessive torque between the rotary part and a rotating shaft of a device to be driven, is coupled by threads to the rotating shaft, and is capable of rotating together with the rotating shaft as one body, wherein:
    the rotary part is installed so that one side of the rotary part comes into contact with the rotary shaft and another other side of the rotary part faces the power transmission shut-off member;
    the power transmission device further comprises an elastic member installed between the power transmission shut-off member and the rotary part; and
    the elastic member exerts a repulsive force on the power transmission shut-off member and the rotating shaft in a direction to separate the rotating shaft and the power transmission shut-off member.

2. The power transmission device as set forth in claim 1, wherein the power transmission shut-off member is configured so as to split into a first portion not threadedly coupled to the rotating shaft and a second portion threadedly coupled to the rotating shaft when the power transmission shut-off member operates, and is further configured so that the first portion can move freely with respect to the second portion when the power transmission shut-off member operates.

3. The power transmission device as set forth in claim 2, wherein the first portion is configured so as to be capable of moving freely in the axial direction of the rotating shaft.

4. The power transmission device as set forth in claim 1, wherein an elastic force of the elastic member acts on the power transmission shut-off member in the axial direction of the rotating shaft.

5. The power transmission device as set forth in claim 2, wherein the elastic member acts on the first portion so that the first portion separates from the second portion when the power transmission shut-off member operates.

6. The power transmission device as set forth in claim 1, further comprising at least a stopper means, wherein at least the stopper means prevents the power transmission shut-off member from dropping when the power transmission shut-off member operates and between the stopper means and the power transmission shut-off member, a gap is provided.

7. The power transmission device as set forth in claim 1, wherein the elastic member is a disc spring, rubber, or a coil spring.

8. The power transmission device as set forth in claim 1, wherein:
the rotary part comprises a hub;
the hub connects to the power transmission shut-off member; and
the hub is installed so that one side of the hub comes into contact with the rotary shaft and the other side thereof faces the power transmission shut-off member.

9. A power transmission device comprising:
a rotatable rotary part to which a rotational drive force is transmitted from a drive source;
a power transmission shut-off member, which discontinues transmission of rotational drive force when an excessive torque is applied between the rotary part and a rotating shaft of a device to be driven; and
an elastic member located between the power transmission shut-off member and the rotary part, wherein
the power transmission shut-off member is configured to break when excessive torque is applied between the rotary part and the rotating shaft,
the power transmission shut-off member is coupled by threads to the rotating shaft, and, prior to breaking, rotates together with the rotating shaft as one body,
the rotary part is located so that a first side of the rotary part contacts the rotary shaft and a second side of the rotary part, which is opposite to the first side of the rotary part, faces the power transmission shut-off member, and
the elastic member urges the power transmission shut-off member and the rotating shaft away from one another axially such that, upon breakage of the shut-off member, the rotating shaft and the power transmission shut-off member are separated from one another in an axial direction of the rotary shaft.

10. The power transmission device as set forth in claim 9, wherein the power transmission shut-off member is configured to break into a first portion, which is not coupled by threads to the rotating shaft, and a second portion, which is coupled by threads to the rotating shaft, when the power transmission shut-off member breaks and is further configured so that the first portion moves axially with respect to the second portion when the power transmission shut-off member breaks.

11. The power transmission device as set forth in claim 9, wherein the elastic member acts on the first portion so that the first portion separates from the second portion when the power transmission shut-off member breaks.

12. The power transmission device as set forth in claim 9, further comprising at least a stopper means, wherein at least the stopper means prevents the power transmission shut-off member from dropping when the power transmission shut-off member operates and between the stopper means and the power transmission shut-off member, a gap is provided.

13. The power transmission device as set forth in claim 9, wherein the elastic member is a disc spring, rubber, or a coil spring.

14. The power transmission device as set forth in claim 9, wherein:
the rotary part comprises a hub;
the hub connects to the power transmission shut-off member; and
the hub is installed so that a first side of the hub contacts the rotary shaft and a second side of the hub, which is opposite to the first side of the hub, faces the power transmission shut-off member.

* * * * *